United States Patent Office 3,223,717
Patented Dec. 14, 1965

3,223,717
16-FLUOROMETHYL PREGNENE DERIVATIVES
Albert Bowers and John Edwards, Mexico City, Mexico, assignors, by mesne assignments, to Syntex Corporation, a corporation of Panama
No Drawing. Filed Oct. 18, 1960, Ser. No. 63,265
Claims priority, application Mexico, July 12, 1960, 59,144, 59,023
22 Claims. (Cl. 260—397.4)

The present invention relates to novel cyclopentanophenanthrene derivatives and to a novel process for the production thereof.

More particularly the present invention relates to novel 16α-trifluoromethyl, 16α-difluoromethyl and 16α-monofluoromethyl derivatives of the pregnane series and more specifically to derivatives of Δ⁴-pregnene-3,20-diones which may also have a hydroxy or acyloxy group at C-17α and/or C-21, halogen or a methyl group at C-6 and unsaturation at C-1, 2 and/or at C-6, 7.

The novel compounds of the present invention which are potent progestational agents with good oral activity as well as are useful intermediates for the preparation of the novel cortical hormones described in our copending application Serial No. 63,267, filed of even date now U.S. Patent No. 3,155,695, are represented by the following formulas:

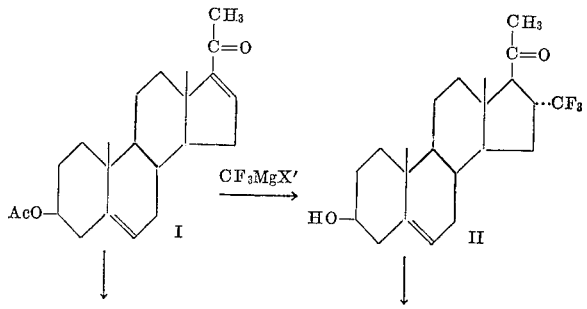

In the above formulas, X represents a trifluoromethyl, difluoromethyl or a monofluoromethyl group; Z represents a double bond or a saturated linkage between C-1 and C-2; Z' represents a double bond or a saturated linkage between C-6 and C-7; R' represents hydrogen, methyl, fluorine or chlorine; R and R'' represent hydrogen or the acyl radical of a hydrocarbon carboxylic acid of less than 12 carbon atoms, which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 8 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds of the present invention possessing a trifluoromethyl group at C-16α may be prepared by a process illustrated by the following equation:

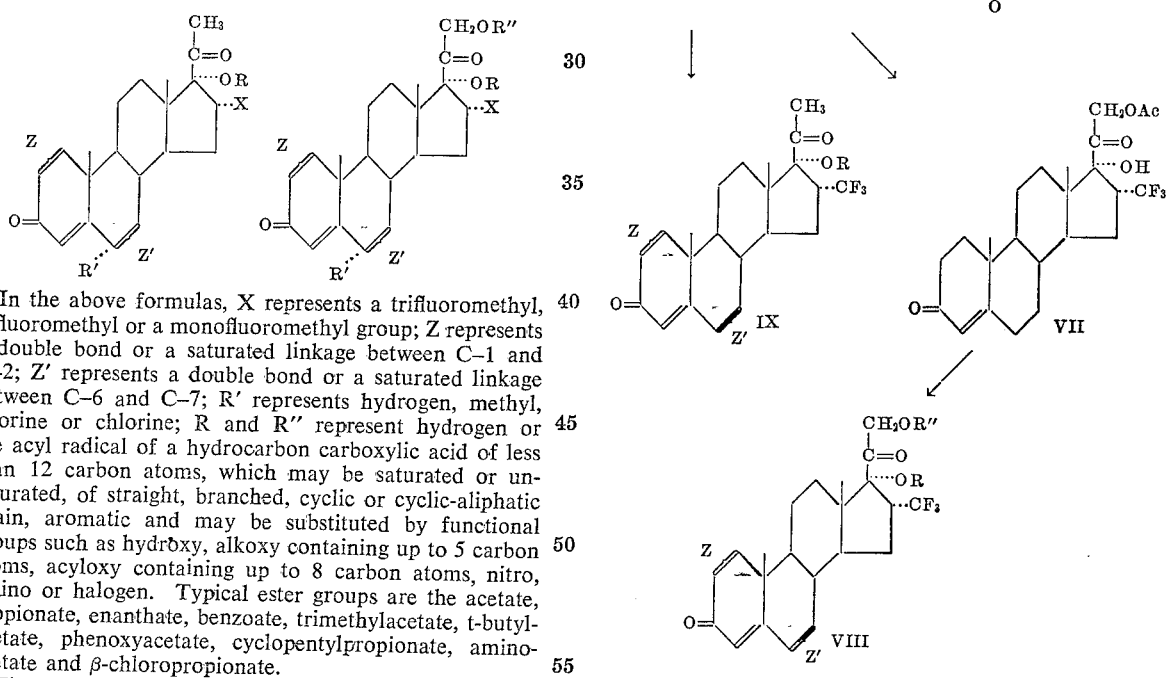

In the above equation, X' represents a halogen such as iodine, bromine or chlorine; Ac represents acetyl or other acyl group derived from hydrocarbon carboxylic acids of less than 12 carbon atoms of the type previously mentioned and R, R'', Z and Z' have the same meaning as heretofore set forth.

In practicing the process outlined above, 3β-acetoxy-Δ⁵,¹⁶-pregnadiene-20-one (I) is treated with an excess of trifluoromethyl magnesium halide, preferably trifluoromethyl magnesium iodide, in a solvent such as tetrahydrofuran or diethyl ether, in the absence or presence of a catalyst such as cuprous chloride, at a low temperature of the order of −30° C. to 20° C., preferably between −20° C. and −10° C., for a period of time ranging from 10 minutes to 5 hours and preferably for 2 to 3 hours to form with simultaneous hydrolysis of the acetoxy group, 16α-trifluoromethyl-Δ$^5$-pregnen-3β-ol-20-one (II). If one molar equivalent of the trifluoromethyl Grignard reagent is employed, the acetoxy group remains intact. For introduction of a hydroxyl group at C–17α, the latter compound (II) is treated with a mixture of acetic anhydride and acetyl chloride or with acetic anhydride in the presence of p-toluenesulfonic acid to form the enol acetate, 16α-trifluoromethyl-Δ$^{5,17(20)}$-pregnadiene-3β,20β-diol-diacetate (III). Alternatively, when the excess of Grignard reagent is added to the 3β-acetoxy-Δ$^{5,16}$-pregnadien-20-one in the presence of a catalyst such as cuprous chloride, there is formed as the product of the 1,4-addition of the reactive Grignard a mixture of C–20 epimers of the Δ$^{17(20)}$-magnesium halide enolate (IV) which upon reaction with acetyl chloride is transformed into the enol acetate, 16α-trifluoromethyl-Δ$^{5,17(20)}$-pregnadiene-3β,20-diol diacetate (III).

Upon subsequent reaction of the latter compound with a peracid such as perbenzoic acid, the corresponding 16α-trifluoromethyl - 5,6; 17,20-bis-oxido-pregnan-3β,20-diol diacetate is formed which upon treatment with a base such as methanolic potassium hydroxide is converted into 16α - trifluoromethyl - 5α,6α-oxido-pregnane-3β,17α-diol-20-one (V). The latter is then treated with zinc and sodium iodide in acetic acid to regenerate the C–5, 6 double bond and thus form 16α-trifluoromethyl-Δ$^5$-pregnene-3β,17α-diol-20-one. The 3β-hydroxy group of this latter compound is then oxidized to the keto group by conventional treatment with chromic acid in acetone and the Δ$^5$ double bond is shifted to a Δ$^4$ double bond by treatment with dry hydrogen chloride in glacial acetic acid or with oxalic acid in methanol-water solution.

For introduction of an additional double bond at C–1, 2, the 16α-trifluoromethyl-Δ$^4$-pregnen-17α-ol-3,20-dione (VI) is refluxed with selenium dioxide preferably in mixture with tertiary butanol and in the presence of catalytic amounts of pyridine or is heated with 2,3-dichloro-5,6-dicyano-1,4-benzoquinone in dioxane to produce the 16α-trifluoromethyl-Δ$^{1,4}$-pregnadien-17α-ol-3,20-dione (IX: Z=double bond; Z'=saturated linkage; R=hydrogen).

The 6-dehydro derivative of 16α-trifluoromethyl-Δ$^4$-pregnen-17α-ol-3,20-dione (IX: Z=saturated linkage; Z'=double bond; R=hydrogen) is obtained by reacting the 16α - trifluoromethyl - Δ$^4$ - pregnen-17α-ol-3,20-dione (VI) with chloranil in an inert solvent such as tertiary butanol, xylene or a mixture of ethyl acetate or amyl acetate and acetic acid.

The 1,6-bis dehydro-derivative of 16α-trifluoromethyl-Δ$^4$-pregnen-17α-ol-3,20-dione (IX: Z=Z'=double bond; R=hydrogen) is obtained either by refluxing the 1-dehydro derivative described above with chloranil or by refluxing the 6-dehydro derivative with selenium dioxide or 2,3-dichloro-5,6-dicyano-1,4-benzoquinone.

The 17α-hydroxyl group can be esterified prior to or subsequent to the dehydrogenation of C–1, 2 and/or C–6, 7 by reacting the 16α-trifluoromethyl-Δ$^4$-pregnen-17α-ol-3,20-dione (VI), or the 1-dehydro, 6-dehydro or 1,6-bis-dehydro-derivative thereof (IX) with a hydrocarbon carboxylic acid anhydride of less than 12 carbon atoms in benzene solution and in the presence of p-toluenesulfonic acid.

By monoiodination at C–21 of the 16α-trifluoromethyl-Δ$^4$-pregnen-17α-ol-3,20-dione (VI) as by reaction with an excess of iodine in the presence of a base such as solid calcium oxide in mixture with tetrahydrofuran and methanol (as described by Stork et al. in U.S. Patent 2,874,154), followed by reflux of the thus formed 21-iodo compound with sodium acetate or potassium acetate in mixture with acetone, there is introduced an acetoxy group at C–21 to thus form 16α-trifluoromethyl-Δ$^4$-pregnene-17α-21-diol-3,20-dione-21-acetate (VII). Upon reflux of the latter compound with selenium dioxide or 2,3 - dichloro - 5,6 - dicyano-1,4-benzoquinone, there is formed 16α-trifluoromethyl-Δ$^{1,4}$-pregnadiene-17α,21-diol-3,20-dione-21-acetate (VIII: Z=double bond; Z'=saturated linkage; R=hydrogen; R''=acetyl). While upon treatment with chloranil in the manner described above, there is formed 16α-trifluoromethyl-Δ$^{4,6}$-pregnadiene-17α,21-diol-3,20-dione-21-acetate (VIII: Z=saturated linkage; Z'=double bond; R=hydrogen; R''=acetyl). By combining the steps of dehydrogenation, there is formed 16α - trifluoromethyl - Δ$^{1,4,6}$-pregnatriene-17α,21-diol-3,20-dione-21-acetate (VIII: Z=Z'=double bond; R=hydrogen; R''=acetyl). The ester group is saponified as by treatment with methanolic potassium hydroxide and by conventional esterification with hydrocarbon carboxylic acid anhydrides of the type mentioned previously, other C–21 esters are prepared. The tertiary hydroxyl group at C–17α can be esterified prior to or subsequent to the dehydrogenation at C–1,2 and/or C–6,7 or prior to the introduction of the ester group at C–21 by reaction with the desired hydrocarbon carboxylic acid anhydride in benzene solution and p-toluenesulfonic acid to form the corresponding diesters (VIII: R and R''=acyl).

The 16α-trifluoromethyl derivatives of Δ$^4$-pregnene-17α, 21-diol-3,20-dione, of Δ$^{1,4}$-pregnadiene-17α,21-diol-3,20-dione, of Δ$^{4,6}$ and of Δ$^{1,4,6}$-pregnatriene-17α,21-diol-3,20-dione can be subjected to microbiological oxidation as by incubation with andrenal glands or with the microorganism Curvularia lunata ATCC 13935, to produce 16α-trifluoromethyl hydrocortisone, 16α-trifluoromethyl-prednisolone, the 6-dehydro derivatives thereof and finally the 9α-halo substituted derivatives and the 11-keto derivatives as are more fully disclosed in our copending application Serial No. 63,267, filed of even date, now U.S. Patent No. 3,155,695.

By substituting in the above process the trifluoromethyl magnesium halide by monofluoromethyl magnesium halide there is produced all of the above compounds having a monofluoromethyl group at C–16α in place of the trifluoromethyl group. Thus there are produced 16α-monofluoromethyl-Δ$^5$-pregnen-3β-ol-20-one, 16α monofluoromethyl-Δ$^{5,17(20)}$-pregnadiene - 3β,20 - diol - diacetate, 16α-monofluoromethyl-5,6,17,20-bis - oxido - pregnane-3β,20-diol - diacetate, 16α-monofluoromethyl-5α-6α-oxido-pregnane-3β,17α-diol-20-one, 16α-monofluoromethyl-Δ$^5$-pregnene-3β,17α-diol-20-one, 16α-monofluoromethyl-Δ$^4$-pregnen-17α-ol-3,20-dione, the 1-dehydro, 6-dehydro and 1,6-bis-dehydro derivatives of the latter compound as well as the hydrocarbon carboxylic acid esters thereof, 16α-monofluoromethyl - 21 - iodo-Δ$^4$-pregnen-17-ol-3,20-dione, 16α-monofluoromethyl - 21 - acetoxy-Δ$^4$-pregnen-17α-ol-3,20-dione, 16α - monofluoromethyl-Δ$^4$-pregnene - 17α,21-diol-3,20-dione and the 1-dehydro, 6-dehydro, 1,6-bis-dehydro and ester derivatives thereof.

By applying the process outlined above to 6-methyl-Δ$^{5,16}$-pregnadien-3β-ol-20-one acetate (described by Petrow et al., J. Chem. Soc. 4096, 1957) instead of the Δ$^{5,16}$-pregnadien-3β-ol-20-one acetate, there are prepared the corresponding compounds having a methyl group at C–6. Thus there is obtained in a consecutive manner the following compounds, a mixture of C–20 epimers of a magnesium halide enolate of 6-methyl-16α-trifluoromethyl-Δ$^5$-pregnen-3β-ol-20-one; 6-methyl-16α-trifluoromethyl-Δ$^5$-pregnen-3β-ol-20-one; the diacetate of 6-methyl-16α-trifluoromethyl-Δ$^{5,17(20)}$-3β,20-diol; the diacetate of 6-methyl-16α-trifluoromethyl-5,6; 17,20-dioxido - pregnan-3β,20-diol; 6-methyl-16α-trifluoromethyl-5,6-oxido-pregnan-3β,17α-diol-20-one; 6-methyl - 16α - trifluoromethyl-Δ$^5$-pregnen-3β,17α-diol-20-one; 6α - methyl-16α-trifluoromethyl-17α-hydroxy-Δ$^4$-pregnen-3,20-dione; 6α-methyl-16α-trifluoromethyl-21-acetoxy-Δ$^4$-pregnen 17α-ol-3,20 - dione and 6α-methyl - 16α - trifluoromethyl-Δ$^{1,4}$-pregnadiene-17α,21-diol-3,20-dione, and the corresponding 16α-monofluoromethyl derivatives of the above compounds.

Alternatively, the above novel compounds of the present invention having a trifluoromethyl group at C–16α and a methyl group at C–6α may be prepared by a process illustrated by the following equation:

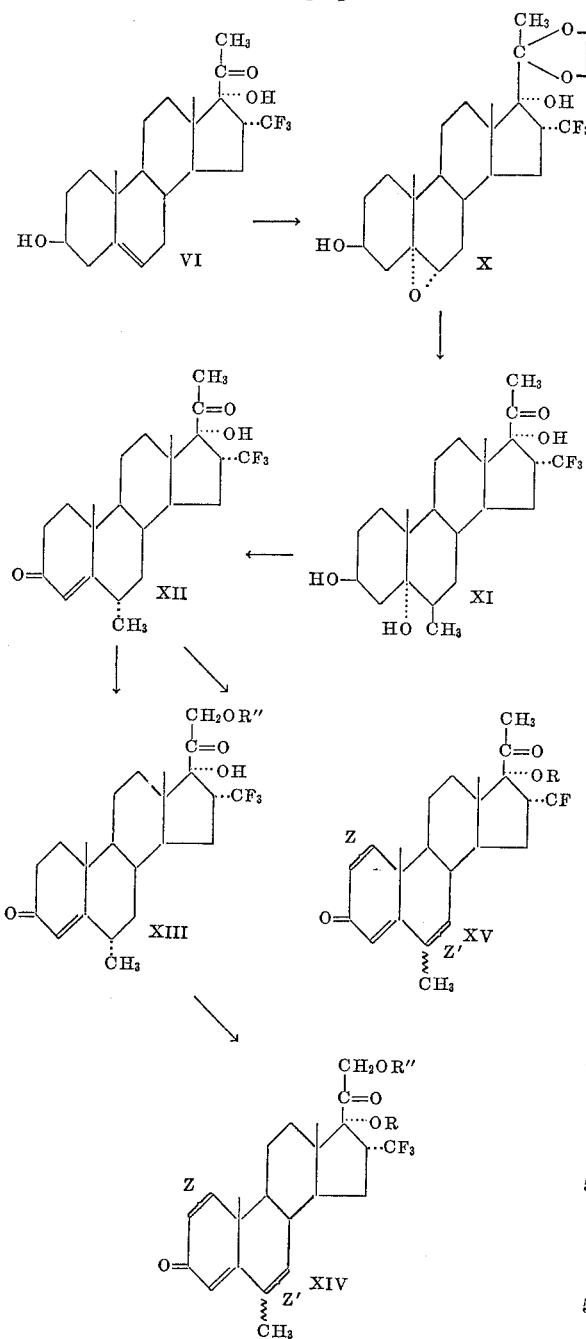

In the above equation, R, R″, Z and Z′ have the same meaning as set forth previously.

In practicing the process outlined above the keto group of 16α-trifluoromethyl-Δ⁵-pregnene-3β,17α-diol-20-one (VI) is protected by formation of the cyclic ketal by conventional reaction with a glycol such as ethylene glycol, followed by oxidation of the 5(6) double bond with a peracid such as monoperphthalic or perbenzoic acid to form 16α-trifluoromethyl-5α,6α-oxido-20-ethylenedioxy-pregnane-3β-17α-diol (X). Treatment of the 5α,6α-oxido compound with methyl magnesium halide, preferably methyl magnesium bromide, followed by ammonium chloride decomposition of the Grignard reagent results in the formation of the 6β-methyl-5α-hydroxy compound and by further treatment with an acid such as p-toluenesulfonic acid in acetone at reflux temperature, hydrolysis of the cyclic ketal group is effected to thus form 16α-trifluoromethyl-6β-methyl-pregnane-3β,5α,17α-triol-20-one (XI).

Upon oxidation of the latter compound with chromium trioxide in acetone, the 3β-hydroxy-group is converted into the 3-keto group to produce 16α-trifluoromethyl-6β-methyl-pregnane-5α,17α-diol-3,20-dione which upon reaction with methanolic potassium hydroxide results in dehydration at C–5 with introduction of the double bond at C–4(5) and concomitant inversion of the 6β-methyl group to produce 16α-trifluoromethyl-6α-methyl-Δ⁴-pregnen-17α-ol-3,20-dione (XII) (16α-trifluoromethyl-6α-methyl-17α-hydroxy-progesterone). The latter compound is then converted, stepwise, into the C–21-iodo, C–21-acetoxy (XIII; R=acetyl) and C–21-hydroxy compound (XIII: R=hydrogen) in the same manner as described for the C–6 unsubstituted compound.

A double bond can then be introduced at C–1, 2 in the above compounds as by treatment with selenium dioxide or 2,3-dichloro-5,6-dicyano-1,4-benzoquinone and/or at C–6, 7 by treatment with chloranil as described hereinabove to form the 1-dehydro, 6-dehydro and 1,6-bis-dehydro derivatives of 6α-methyl-16α-trifluoromethyl-Δ⁴-pregnen-17α-ol-3,20-dione (XV) and of 6α-methyl-16α-trifluoromethyl-Δ⁴-pregnene-17α,21-diol-3,20-dione (XIV) and of the esters thereof with hydrocarbon carboxylic acid esters of the type heretofore set forth.

In a similar manner by following the process outlined above there are produced the corresponding 6-methyl-16α-monofluoromethyl derivatives by substituting the starting material 16α-trifluoromethyl-Δ⁵-pregnene-3β,17α-diol-20-dione by 16α-monofluoromethyl-Δ⁵-pregnene-3β,17α-diol-20-one.

The novel compounds of the present invention having a trifluoromethyl group at C–16α and a fluoro group at C–6α may be prepared by a process illustrated by the following equation:

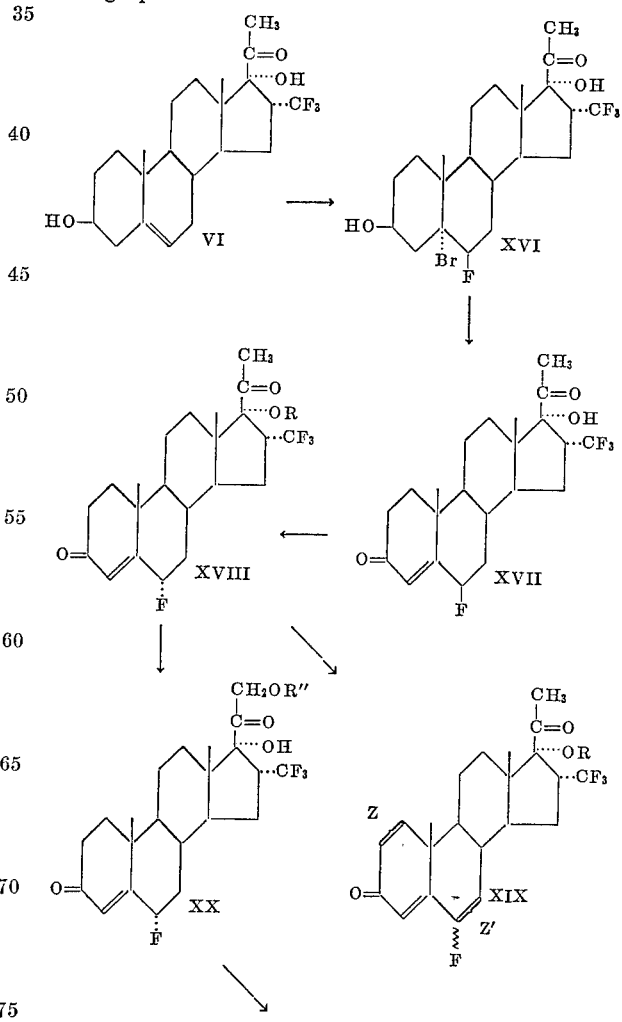

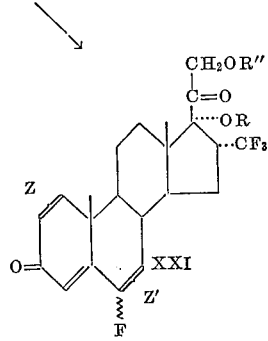

In the above formulas, R, R'', Z and Z' have the same meaning as heretofore set forth.

In practicing the process outlined above, N-bromoacetamide is added to a solution of 16α-trifluoromethyl-Δ⁵-pregnene-3β,17α-diol-20-one (VI) in methylene-dichloride-tetrahydrofuran solution containing a large excess of anhydrous hydrogen fluoride. The reaction mixture is maintained at −40° C. for 6 hours to form 16α-trifluoromethyl-5α-bromo-6β-fluoro - pregnane-3β,17α-diol-20-one (XVI). Upon oxidation with 8N chromic acid, the 3β-hydroxy group is converted to the 3-keto group and by subsequent reaction with sodium acetate and methanol, dehydrobromination at C–5 is effected to thus form 6β- (XVII). Upon reaction of the latter compound with a mineral acid, inversion of the steric configuration at C–6 is effected and there is formed 6α-fluoro-16α-trifluoromethyl-Δ⁴-pregnen-17α-ol-3,20-dione (XVIII: R=hydrogen). Introduction of a double bond at C–1, 2 and/or at C–6, 7 by the methods of dehydrogenation described previously results in the formation of 6α-fluoro-16α-trifluoromethyl-Δ¹,⁴-pregnadien-17α-ol-3,20-dione (XIX: Z=double bond; Z'=saturated linkage; R= hydrogen), 6-fluoro-16α - trifluoromethyl-Δ⁴,⁶-pregnadien - 17α-ol-3,20 - dione fluoro-16α-trifluoromethylΔ⁴-pregnen - 17α-ol-3,20-dione (XIX: Z=saturated linkage; Z'=double bond; R=hydrogen), and 6-fluoro-16α-trifluoromethyl-Δ¹,⁴,⁶-pregnatrien-17α-ol-3,20-dione (XIX: Z=Z'=double bond; R=hydrogen).

Esterification of the tertiary hydroxyl group at C–17α in the above compounds (XVIII and XIX) is effected by reaction with hydrocarbon carboxylic acid anhydrides containing less than 12 carbon atoms in benzene solution and in the presence of p-toluenesulfonic acid.

The C–21 hydroxy group is introduced into the 6α-fluoro - 16α - trifluoromethyl-Δ⁴-pregnen-17α-ol-3,20-dione compound (XVIII) or the ester derivative thereof by the method of Stork et al., U.S. Patent 2,874,154 and Ringold et al., J. Am. Chem. Soc. 80, 250 (1958) to form the 6α-fluoro-16α-trifluoromethyl-Δ⁴-pregnen-17α,21-diol-3,20-dione (XX: R''=hydrogen). The latter is converted into the Δ¹, Δ⁶, Δ¹,⁶-bis-dehydro-derivatives (XXI: R=R''=hydrogen) by the methods of dehydrogenation described above. Conventional esterification with hydrocarbon carboxylic acid anhydrides or chlorides results in the formation of the C–21 esters (XX and XXI: R''=acyl; R=hydrogen). Esterification of the tertiary hydroxyl group at C–17α is effected with the desired acid anhydride in benzene and p-toluenesulfonic acid to thus form diesters (XXI: R=R''=acyl) having the same or different ester groups depending upon the acid anhydride that is employed.

The novel compounds of the present invention having a monofluoromethyl group at C–16α and a fluoro group at C–6α may be prepared in the same manner described above for the 16α-trifluoromethyl series by starting with 16α - monofluoromethyl - Δ⁵-pregnene-3β,17α-diol-20-one instead of the corresponding 16α-trifluoromethyl compound.

Alternatively the fluoro group may be introduced at C–6 by esterifying 16α-monofluoromethyl or 16α-trifluoromethyl Δ⁵-pregnen-3β,17α-diol-20-one with acetic anhydride by conventional methods to produce the corresponding 3β-acetate. Upon further esterification with a hydrocarbon carboxylic acid of less than 12 carbon atoms in benzene solution and in the presence of p-toluenesulfonic acid, there is formed the 16α-monofluoromethyl or 16α-trifluoromethyl-Δ⁵-pregnen-3β,17α-diol-20-one-diacylate. By treatment with dilute methanolic potassium hydroxide, the acetoxy group at C–3β is selectively saponified and there is formed 16α-monofluoromethyl or 16α-trifluoromethyl-Δ⁵-pregnene-3β,17α-diol-29-one-17-acylate. Upon treatment of the latter compound with a peracid such as monoperphthalic or perbonzoic acid the 5,6 double bond is oxidized and there is formed the 5α,6α-oxido-16α-monofluoromethyl or 16α - trifluoromethyl - pregnane-3β,17α-diol-20-one 17α-acylate. Upon reaction of the latter compound with boron trifluoride the oxido ring is opened and there is formed 16α-monofluoromethyl or 16α-trifluoromethyl-6β - fluoro - pregnane-3β,5α,17α-triol-20-one 17α-acylate. Upon oxidation of the latter compound with chromic acid, the 3β-hydroxy group is converted into the 3-keto group and by further reaction with concentrated hydrochloric acid, dehydration at C–5 is effected with simultaneous inversion of the steric configuration at C–6 to form 16α-monofluoromethyl or 16α-trifluoromethyl-6α-fluoro-Δ⁴-pregnen-17α-ol-3,20-dione-acylate. Dehydrogenation at C–1,2 and/or at C–6,7 is effected by treatment with selenium dioxide or 2,3-dichloro-5,6-dicyano-1,4-benzoquinone, and/or chloranil in the manner described previously to produce the 1-dehydro, 6-dehydro or 1,6-bis-dehydro-derivatives. The C–21 hydroxy group may then be introduced by the method described by Stork et al. and Ringold et al., supra.

The following equation exemplifies in part the above process as applied to the 16α-monofluoromethyl derivative:

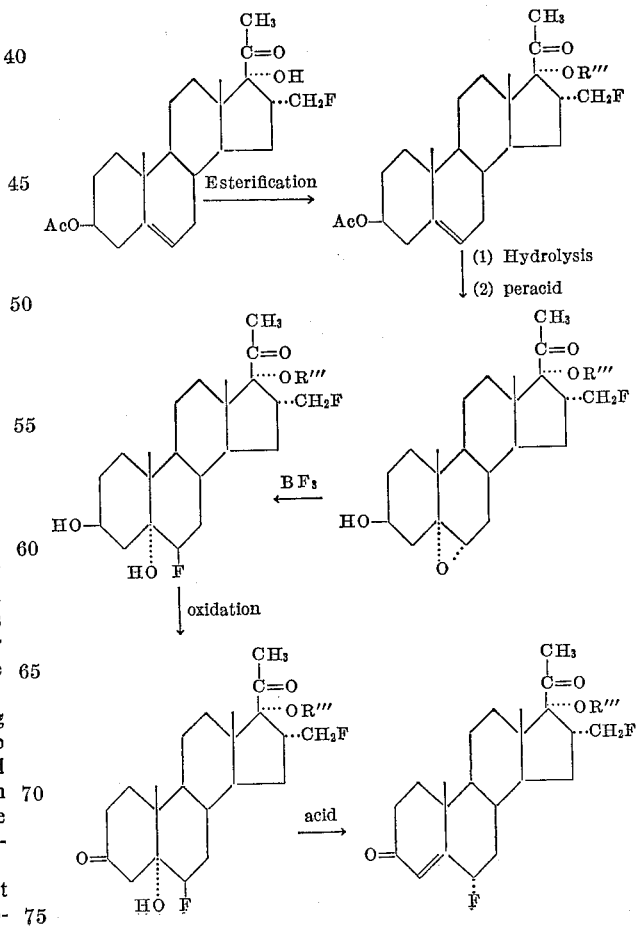

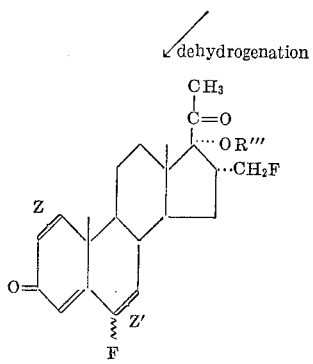

In the above equation, R''' represents a hydrocarbon carboxylic acyl group of the type previously described Ac, Z and Z' have the same meaning as heretofore set forth.

The novel compounds of the present invention having a trifluoromethyl group at C–16α and a chloro group at C–6α may be prepared by a process illustrated by the following equation:

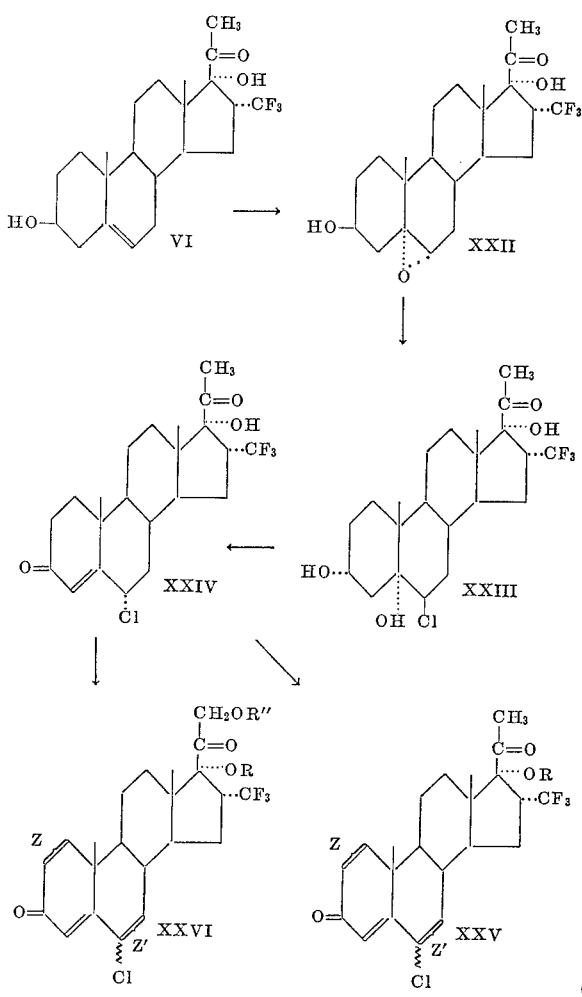

In the above formulas, R, R'', Z and Z' have the same meaning as previously set forth.

In practicing the process outlined above, 16α-trifluoromethyl-Δ⁵-pregnene-3β,17α-diol-20-one (VI) is reacted with a peracid such as monoperphthalic or perbenzoic acid to oxidize the 5(6) double bond to form 16α-trifluoromethyl - 5α,6α - oxido - pregnane-3β,17α-diol-20-one (XXII). Upon reaction of the latter compound with concentrated hydrochloric acid in glacial acetic acid there is formed 16α-trifluoromethyl-6β-chloro-pregnane-3β,5α, 17α-triol-20-one (XXIII), which upon oxidation with chromic acid is converted into 16α-trifluoromethyl-6β-chloro-pregnane-5α,17α-diol-3,20-dione. Treatment of the latter compound in glacial acetic with dry hydrochloric acid results in dehydration and in the inversion of the steric configuration at C–6 and there is afforded 16α-trifluoromethyl - 6α - chloro - Δ² - pregnen-17α-ol-3,20-dione (XXIV) which can be further dehydrogenated at C–1,2 and/or C–6,7 by the methods described previously to yield 16α-trifluoromethyl-6α-chloro-Δ¹,⁴-pregnadien-17α-ol-3,20-dione (XXV: Z=double bond; Z'=saturated linkage; R=hydrogen); 16α - trifluoromethyl - 6 - chloro-Δ⁴,⁶-pregnadien-17α-ol-3,20-dione (XXV: Z=saturated linkage; Z'=double bond; R=hydrogen) and 16α-trifluoromethyl - 6-chloro - Δ¹,⁴,⁶-pregnatrien-17α-ol-3,20-dione (XXV: Z=double bond; R=hydrogen).

The 16α-trifluoromethyl-6α-chloro-Δ⁴-pregnen-17α-ol-3-20-dione (XXIV) is converted, stepwise, into the C–21 iodo, C–21-acetoxy (XXVI: R''=acetyl; R=hydrogen; Z=Z'=satuarted linkage) and C–21 hydroxy compound (XXVI: R''=R=hydrogen; Z=Z'=saturated linkage) by the method of Stork et al. and Ringold et al., supra.

Upon conventional esterification with hydrocarbon carboxylic acid anhydrides or chlorides of the type previously mentioned, there are formed the C–21 esters. The tertiary hydroxyl group at C–17α is esterified in the manner described heretofore either prior to or subsequent to the dehydrogenation steps or the introduction of the C–21 hydroxy moiety to form the esters of compounds XXV and XXVI.

By substituting in the process outlined above the 16α-trifluoromethyl-Δ⁵-pregnene-3β,17α-diol-20-one by 16α-monofluoromethyl-Δ⁵-pregnene-3β,17α-diol-20-one, there are produced the corresponding 16α-monofluoromethyl compounds.

Alternatively the 6α-chloro group may be introduced by treating the ester of 16α-trifluoromethyl-Δ⁴-pregnen-17α-ol-3,20-dione (IX: Z=Z'=saturated linkage; R=acyl) or the corresponding 16α-monofluoromethyl derivative with ethyl orthoformate to form the enol ether, 16α-trifluoromethyl or 16α-monofluoromethyl-3-ethoxy-Δ³,⁵-pregnadien-17α-ol-20-one-acylate. Upon treatment of the latter in acetone and sodium acetate with N-chlorosuccinimide and acetic acid there is obtained 16α-trifluoromethyl or 16α-monofluoromethyl-6β-chloro-17α-acyloxy-Δ⁴-pregnene-3,20-dione, which, upon further reaction with concentrated hydrochloric acid and acetic acid results in inversion of the steric configuration at C–6 to form 16α-trifluoromethyl or 16α-monofluoromethyl - 6α - chloro-17α-acyloxy-Δ⁴-pregnene-3,20-dione. Further reaction with solenium dioxide or 2,3-dichloro-5, 6-dicyano-1,4-benzoquinone and/or chloranil results in dehydrogenation at C–1,2 and/or C–6,7. By applying the method of Stork et al. or Ringold et al., described above, there is introduced a hydroxy group at C–21 which may be further esterified with hydrocarbon carboxylic acid anhydrides by conventional methods.

The novel compounds of the present invention possessing a difluoromethyl group at C–16α are prepared by a process illustrated by the following equation:

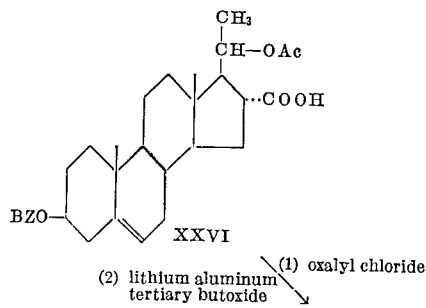

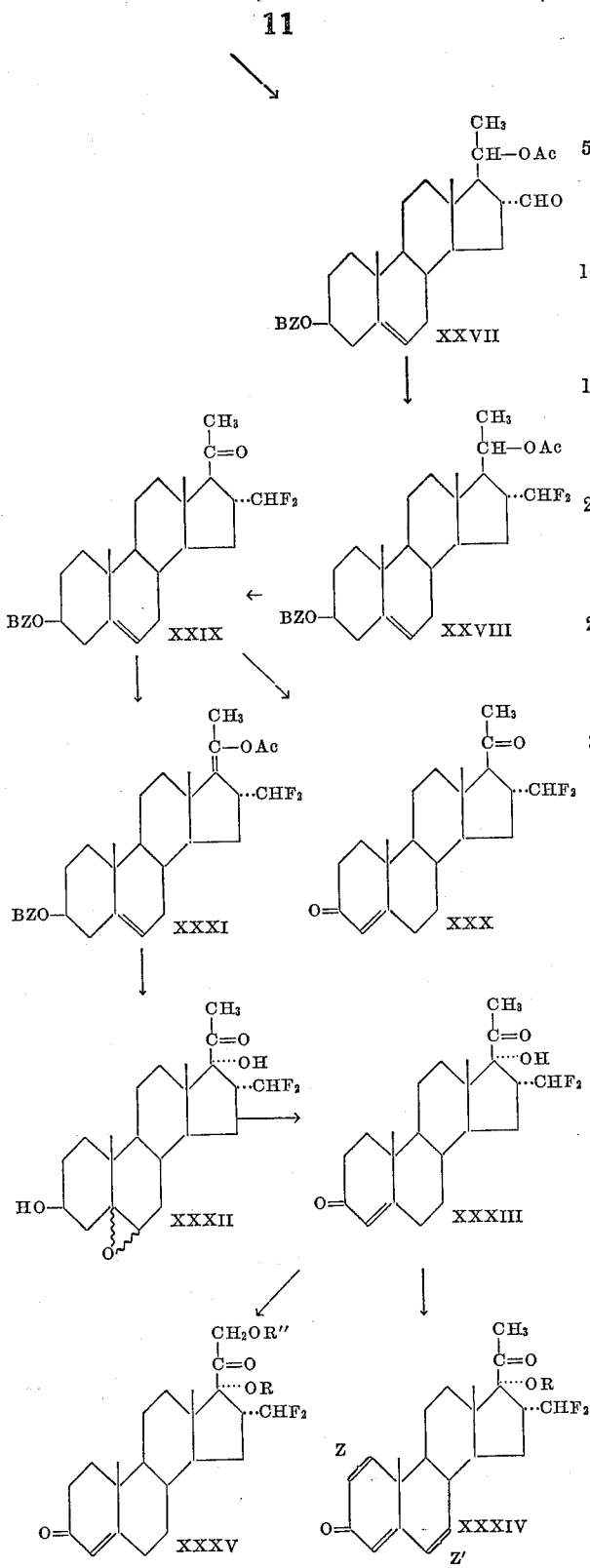

In the above formulas, Ac, R, R″, Z and Z′ have the same meaning as previously set forth.

To practice the process outlined above, the starting material, the 3-benzoate-20-acetate of Δ⁵-pregnene-3β.20β-diol - 16α - carboxylic acid is prepared by treating 16α-cyano-Δ⁵-pregnen-3β-ol-20-one acetate, described by J. Romo, Tetrahedron 3, 37 (1958), with sodium borohydride to reduce the C–20-keto group to the C–20 hydroxyl group which is then etherified by reaction with dihydropyran in benzene solution and in the presence of p-toluenesulfonic acid. The thus formed 20β-tetrahydropyranyloxy-16α-cyano-Δ⁵-pregnen-3β-ol-acetate is hydrolyzed by refluxing with methanolic potassium hydroxide, followed by benzoylation by conventional reaction with benzoyl chloride to afford the 3-benzoyloxy-20β-tetrahydropyranyloxy-Δ⁵-pregnene-16α-carboxylic acid. Hydrolysis of the tetrahydropyranyl ether moiety as by reaction of the latter compound in acetic acid with dilute hydrochloric acid followed by acetylation of the thus formed C–20β alcohol by conventional means affords the starting material, the 3-benzoate-20-acetate of Δ⁵-pregnene-3β-20β-diol-16α-carboxylic acid (XXVI). Treatment of the latter compound with oxalyl chloride followed by reduction of the thus formed acid chloride of XXVI by the reaction with lithium aluminum t-butoxide or by the method of Rosenmund results in the formation of the 3-benzoate-20-acetate of Δ⁵-pregnene-3β,20β-diol-16α-carboxaldehyde (XXVII). The latter compound is then reacted with a large excess of sulfur tetrafluoride in benzene solution for a period of time in the order of 48 hours to effect replacement of the 16α-carboxaldehyde group by the difluoromethyl group and thus form 16α-difluoromethyl-Δ⁵-pregnene-3β,20β-diol-3 - benzoate - 20-acetate (XXVIII). The acetate group is preferentially saponified as by treatment with methanolic potassium carbonate, followed by oxidation of the thus formed C–20 alcohol with 8 N chromic acid to produce 16α-difluoromethyl-Δ⁵-pregnen-3β-ol-20-one-benzoate (XXIX) which upon saponification with methanolic potassium hydroxide is converted into 16α-difluoromethyl-Δ⁵-pregnen-3β-ol-20-one. The latter compound is subjected to oxidation under Oppenauer conditions to thus form 16α-difluoromethyl progesterone (XXX).

For introduction of a hydroxy group at C–17α, the 16α-difluoromethyl-Δ⁵-pregnen-3β-ol-20-one benzoate (XXIX) intermediate described above is treated in the same manner as the 16α-trifluoromethyl compound. This reaction of the intermediate compound with acetic anhydride and p-toluenesulfonic acid results in the formation of the enol acetate, 16α-difluoromethyl-Δ⁵,¹⁷⁽²⁰⁾-pregnadiene-3β,20β-diol-3-benzoate,-20-acetate (XXXI). Upon subsequent reaction with a peracid such as monoperphthalic acid, the corresponding 16α - difluoromethyl-5,6;17,20-dioxido-pregnan - 3β - 20 - diol,3-benzoate-20-acetate is formed which upon treatment with a base such as dilute methanolic potassium hydroxide under an atmosphere of nitrogen is converted into 16α - difluoromethyl-5α,6α-oxido-pregnane-3β,17α-diol-20-one (XXXII). The latter is then reacted with zinc and sodium iodide in acetic acid to regenerate the 5(6) double bond and the thus formed 16α-difluoromethyl-Δ⁵-pregnene-3β,17α-diol-20-one is subjected to oxidation with 8 N chromic acid followed by treatment with oxalic acid to form 16α-difluoromethyl-Δ⁴-pregnen - 17α - ol-3,20-dione(16α-difluoromethyl-17α-hydroxy-progesterone) (XXXIII). By monoiodination at C–21 of the 16α-difluoromethyl-Δ⁴-pregnen-17α-ol-3,20-dione as by treatment with an excess of iodine in the presence of calcium oxide as described previously, followed by reaction with potassium acetate in mixture with acetone, there is formed 16α-difluoromethyl-Δ⁴-pregnene-17α,21-diol-3,20-dione-21-acetate (XXXV) which upon saponification with methanolic potassium hydroxide is converted into the free diol.

Esterification of 16α - difluoromethyl-17α-hydroxy-Δ⁴-pregnene-3,20-dione (XXXIII) is effected by reaction with the desired hydrocarbon carboxylic acid anhydride of less than 12 carbon atoms of the type previously mentioned in benzene solution and in the presence of p-toluenesulfonic acid to afford the 16α-difluoromethyl-17α-acyloxy-Δ⁴-pregnene-3,20-dione compound (XXXIV; Z and Z′=saturated linkage). By treating 16α-difluoromethyl-17α-hydroxy-Δ⁴-pregnene-3,20-dione (XXXIII) or the 17α-ester derivative (XXXIV; Z and Z′=saturated linkage) with selenium dioxide or with 2,3-dichloro-5,6-dicyano-1,4-benzoquinone, dehydrogenation is effected at C-1,2 to form the 16α-difluoromethyl-17α-hydroxy-Δ$^{1,4}$-pregnadiene-3,20-dione (XXXIV; R=hydrogen; Z=double bond; Z'=saturated linkage or the 17-ester derivatives (XXXIV; R=acyl; Z=double bond; Z'=saturated linkage). Further dehydrogenation at C–6,7 is effected by the reaction with a quinone having an oxidation-reduction potential of less than −0.65 such as chloranil, in a solvent such as xylene, t-butanol, or a mixture of ethyl acetate or amyl acetate and acetic acid to thus form 16α-difluoromethyl - 17α - hydroxy - Δ$^{1,4,6}$-pregnatriene-3,20-dione (XXXIV; R=hydrocarbon; Z=Z'=double bond) or the 17-ester derivatives (XXXIII; R=acyl; Z=Z'=double bond). Alternatively, dehydrogenation can first be effected at C–6,7 to afford 16α-difluoromethyl-17α-hydroxy-Δ$^{4,6}$-pregnadiene - 3,20-dione (XXXIV, R=hydrogen; Z=saturated linkage; Z'=double bond) or the 17-ester derivative thereof (XXXIV; R=acyl; Z=saturated linkage; Z'=double bond). The latter compounds can then be further dehydrogenated at C–1,2 as by reaction with selenium dioxide to obtain the same Δ$^{1,4,6}$-pregnatriene compounds set forth above.

For preparation of the novel compounds of the present invention having a difluoromethyl group at C–16α and a methyl, chlorine or fluorine group at C–6α there is first produced the 16α - difluoromethyl-Δ$^5$-pregnene-3β,17α-diol - 20 - one by reacting 16α-difluoromethyl-5,6-oxidopregnane-3β,17α-diol-20-one (XXXII) with zinc and sodium iodide to regenerate the 5(6) double bond. By subjecting the thus formed 16α-difluoromethyl-Δ$^5$-pregnene-3β,17α-diol-20-one to the same reactions as set forth for the corresponding 16α - trifluoromethyl-Δ$^5$-pregnene-3β,17α-diol-20-one there are produced the corresponding compounds having a difluoromethyl group at C–16α and a methyl, fluorine or chlorine substituent at C–6α. Alternatively, a methyl or chlorine substituent can be introduced directly into the 16α-difluoromethyl-5α,6α-oxidopregnane-3β,17α-diol-20-one, obtained by crystallization of the mixture of 5,6-epoxides (XXXII) by the same methods described in the 16α-trifluoromethyl series to obtain the corresponding 6-methyl and 6-chloro-16α-difluoromethyl derivatives.

There are thus produced the 6α-methyl, 6α-fluoro and 6α-chloro derivatives of 16α-difluoromethyl-Δ$^4$-pregnene-17α - ol - 3.20-dione, of 16α-difluoromethyl-Δ$^{1,4}$-pregnadiene-17α-ol-3,20-dione, of 16α-difluoromethyl-Δ$^4$-pregnene - 17α,21-diol-3,20-dione, of 16α-difluoromethyl-Δ$^{1,4}$-pregnadiene - 17α,21 - diol-3,20-dione and of the esters thereof with hydrocarbon carboxylic acid anhydrides containing less than 12 carbon atoms. There are also formed the 6-methyl, 6-fluoro and 6-chloro derivatives of 16α-difluoromethyl-Δ$^{4,6}$-pregnadien-17α-ol-3,20-dione, of 16α-difluoromethyl - Δ$^{1,4,6}$ - pregnatrien-17α-ol-3,20-dione, of 16α - difluoromethyl - Δ$^{4,6}$ - pregnadien-17α,21-diol-3,20-dione and of 16α-difluoromethyl-Δ$^{1,4,6}$-pregnatrien-17α,21-diol-3,20-dione and the hydrocarbon carboxylic acid esters thereof.

The following examples serve to illustrate but are not intended to limit the present invention:

*Preparation of trifluoromethylmagnesium iodide*

By following the method of Haszeldine (J. Chem. Soc. 1257, 1954), there was prepared a filtered solution of trifluoromethyl magnesium iodide in tetrahydrofuran, starting from trifluoroiodomethane (Columbia Organic Chemicals Corporation). Using 2 g. of magnesium, 5 g. of trifluoroiodomethane and 150 cc. of tetrahydrofurane there was obtained a solution containing 3.0 g. of the desired reagent, which solution was kept at a temperature of −30° C.

*Preparation of mono fluoromethylmagnesium iodide*

By following the method of Arkel and Janetsky (Rec. Trav. Chim. 56, 167 (1937)) there was prepared fluoroiodomethane; this compound was treated with magnesium in tetrahydrofuran, according to the method described by Haszeldine (J. Chem. Soc. 1275 (1954)) in order to obtain monofluoromethylmagnesium iodide. Using 2 g. of magnesium, 5 g. of fluoro-iodomethane and 150 cc. of tetrahydrofuran there was obtained a solution containing 3.0 g. of the desired reagent; there were prepared several batches of the above solution and kept at a temperature of approximately −30° C.

EXAMPLE I

To 150 cc. of tetrahydrofuran containing 3 g. of trifluoromethylmagnesium iodide was added a solution of 5 g. of the acetate of Δ$^{5,16}$-pregnadien-3β-ol-20-one in 50 cc. of tetrahydrofurane and 0.7 g. of cuprous chloride. The addition was effected under stirring, over a period of 30 minutes, under an atmosphere of nitrogen and at a temperature between −20° C. and −10° C. The mixture was stirred for a further 2 hours at 0° C. cooled to −30° C. and treated with 10 cc. of acetyl chloride. The temperature was allowed to reach 0° C. and the mixture was kept at this temperature for 20 minutes. There was then added 100 cc. of aqueous saturated ammonium chloride solution followed by 30 cc. of aqueous concentrated sodium acetate solution. Extraction with methylene chloride followed by conventional purification afforded 3.75 g. of 3β,20 - diacetoxy-16α-trifluoromethyl-Δ$^{5,17(20)}$-pregnadiene.

For the next step there were combined several batches of the above compound.

A solution of 10 g. of 3β,20-diacetoxy-16α-trifluoromethyl-Δ$^{5,17(20)}$-pregnadiene in 100 cc. of ether was treated with 300 cc. of a 1 N solution of monoperphthalic acid and the mixture was kept at room temperature for 3 days; at the end of this time it was consecutively washed with dilute sodium chloride solution, sodium carbonate, sodium iodide, sodium thiosulfate and finally with sodium chloride solution; the ether solution was dried over anhydrous sodium sulfate and evaporated to dryness, thus yielding a mixture of 5α,6α-17,20-bis oxido-16α-trifluoromethyl-3β,20-diacetoxy-pregnane and of its 5β,6β-isomer. This mixture was dissolved in 400 cc. of methanol, treated with 5.4 g. of potassium carbonate dissolved in 110 cc. of water and refluxed for 1½ hours; the mixture was neutralized with acetic acid, concentrated to ⅓ of its volume, poured with ice water and the precipitate formed was collected and dried.

EXAMPLE II

The above crude product was added to a mixture of 8.5 g. of sodium iodide, 2.8 g. of anhydrous sodium acetate, 8.5 g. of zinc dust, 33 cc. of acetic acid and 1.2 cc. of water; the mixture was stirred at room temperature for 3 hours, the zinc was removed by filtration and the solution was poured into ice water. The precipitate formed was collected, washed with water to neutrality, dried, dissolved in 200 cc. of hot dimethyl-formamide, filtered through celite to remove traces of zinc and then hot water was added to crystallize the product; after cooling in ice the precipitate was collected by filtration and washed with methanol, thus affording 5 g. of 16α-trifluoromethyl-Δ$^5$-pregnene-3β,17α-diol-20-one.

EXAMPLE III 5 g. of the above compound were dissolved in 50 cc. of acetone, cooled to 0° C., flushed with nitrogen and treated under stirring with 8 N chromic acid solution, added in a thin stream, at 0° C., until the red color of chromium trioxide persisted in the mixture. (The 8 N solution of chromic acid was prepared by dissolving 26.7 g. of chromium trioxide in 23 cc. of concentrated sulfuric acid and diluting with water to 100 cc.) After diluting the mixture with water the product was collected by filtration, washed with water and dried under vacuum.

The crude product was dissolved in 200 cc. of methanol and treated at room temperature with a solution of 0.5 g. of oxalic acid in 5 cc. of water. The mixture was kept standing for 3 hours, then treated with water and the product was collected by filtration, washed with water to neutral and dried. There was thus obtained 16α-trifluoromethyl-17α-hydroxy-Δ⁴-pregnene-3,20-dione.

EXAMPLE IV

To a solution of 3.9 g. of 16α-trifluoromethyl-17α-hydroxy-Δ⁴-pregnene-3,20-dione in 30 cc. of tetrahydrofurane and 18 cc. of methanol was added under vigorous stirring 6 g. of calcium oxide and then 6 g. of iodine; the stirring was continued at room temperature until the color of the solution became pale yellow and then the mixture was poured into ice water containing 15 cc. of acetic acid and 2.1 g. of sodium thiosulfate, stirred for 15 minutes, most of the liquid was separated by decantation and the precipitate was collected, washed with water and dried under vacuum. There was thus obtained 16α-trifluoromethyl-17α-hydroxy-21-iodo-Δ⁴-pregnene-3,20-dione.

The above substance was mixed with 105 g. of anhydrous acetone and 12 g. of recently fused potassium acetate and refluxed for 8 hours, concentrated to a small volume under reduced pressure and diluted with water; the product was extracted with ether, washed with water, dried over anhydrous sodium sulfate and the ether was evaporated. Recrystallization of the residue from acetone-hexane yielded the 21-acetate of 16α-trifluoromethyl-Δ⁴-pregnene-17α,21-diol-3,20-dione.

EXAMPLE V

A mixture of 1.16 g. of the above compound, 120 cc. of t-butanol, 2 cc. of pyridine and 600 mg. of selenium dioxide was refluxed under an atmosphere of nitrogen for 72 hours; after cooling the mixture was diluted with ethyl acetate and filtered through celite; the filtrate was evaporated to dryness under reduced pressure, the residue was triturated with water and the solid collected, washed with water and dried. Recrystallization from methylene chloride-hexane afforded 560 mg. of the 21-acetate of 16α-trifluoromethyl-Δ$^{1,4}$-pregnadiene-17α,21-diol-3,20-dione.

EXAMPLE VI

A solution of the above compound in 20 cc. of methanol was mixed with 5.6 cc. of a 1% solution of potassium hydroxide in water and stirred at 0° C. under an atmosphere of nitrogen for 1 hour; it was then neutralized with acetic acid and the methanol was distilled under reduced pressure. The residue was triturated with water and the solid was collected, washed with water, dried and recrystallized from ethyl acetate-methanol, thus giving approximately 475 mg. of 16α-trifluoromethyl-Δ$^{1,4}$-pregnadiene-17α,21-diol-3,20-dione.

EXAMPLE VII

A solution of 4 g. of the acetate of 16α-trifluoromethyl-Δ⁴-pregnene-17α,21-diol-3,20-dione, obtained in accordance with the method of Example IV, in 150 cc. of methanol and 15 cc. of a 4% aqueous solution of potassium hydroxide was stirred for 1 hour under an atmosphere of nitrogen at 0° C.; the mixture was neutralized with acetic acid and the methanol was distilled under reduced pressure. The residue was triturated with water and the solid was collected, washed with water, dried and recrystallized from ethyl acetate-methanol, thus producing 3.05 g. of 16α-trifluoromethyl-Δ⁴-pregnene-17α,21-diol-3,20-dione.

EXAMPLE VIII

To a polyethylene bottle containing 119 g. of anhydrous tetrahydrofuran was added 70 g. of anhydrous hydrogen fluoride. The mixture was cooled to −70° in a Dry Ice-acetone bath and, under vigorous stirring there was added a mixture, previously cooled to −70° C., of 10 g. of 16α-trifluoromethyl-Δ⁵-pregnene-3β,17α-diol-20-one (described in Example II), and 5.0 g. of N-bromoacetamide in 350 ml. of anhydrous methylene chloride distilled over calcium chloride. The mixture was stirred at −70° C. for 5 hours, poured into aqueous saturated sodium carbonate solution and the precipitate was filtered. The organic layer was separated, the aqueous phase was extracted with several portions of methylene chloride and the extracts were combined, washed with water to neutrality, dried over anhydrous sodium sulfate and evaporated to dryness under vacuum. The original precipitate and the residue of the evaporation were combined and crystallized from acetone, thus affording 9.3 g. of 16α-trifluoromethyl-5α-bromo-6β-fluoro-pregnane-3β,17α-diol-20-one.

EXAMPLE IX

A solution of 2 g. of the above compound in 100 cc. of acetone was cooled to 0° C. and treated under an atmosphere of nitrogen under stirring with a solution of 8 N chromic acid (prepared as in Example III) until the color of the reagent persisted in the mixture. The mixture was then stirred for 2 minutes more at 0–5° C., diluted with water and the precipitate was collected, washed with water and dried under vacuum, thus affording 5α-bromo-6β-fluoro-16α-trifluoromethyl-pregnan-17α-ol-3,20-dione.

EXAMPLE X

The above product was dissolved in methanol and the reaction mixture was treated with 4 g. of anhydrous sodium acetate and refluxed for 2½ hours. The mixture was evaporated to dryness under reduced pressure, water was added to the residue and the precipitate that formed was collected, washed with water, dried and treated with decolorizing charcoal in acetone solution. The charcoal was removed by filtration, the acetone was evaporated and the residue was crystallized from ethyl acetate-hexane. There was thus obtained 6β-fluoro-16α-trifluoromethyl-Δ⁴-pregnen-17α-ol-3,20-dione.

A slow stream of dry hydrogen chloride was introduced for 4 hours into a solution of 1 g. of the above compound in 100 cc. of glacial acetic acid, maintaining the temperature around 20° C. The mixture was then poured into ice water and the precipitate was collected by filtration, washed with water, dried and recrystallized from ethyl acetate-hexane thus yielding 6α-fluoro-16α-trifluoromethyl-Δ⁴-pregnen-17α-ol-3,20-dione.

EXAMPLE XI

A mixture of 1.5 g. of the above compound, 120 cc. of tertiary butanol, 2 cc. of pyridine and 600 mg. of selenium dioxide was refluxed under an atmosphere of nitrogen for 72 hours. After cooling, the mixture was diluted with ethyl acetate and filtered through celite, the filtrate was evaporated to dryness under reduced pressure, the residue was triturated with water and the solid collected, washed with water and dried. Recrystallization from methylene chloride-hexane afforded 6α-fluoro-16α-trifluoromethyl-Δ$^{1,4}$-pregnadien-17α-ol-3,20-dione.

EXAMPLE XII

By following the method described in Example IV except that the 16α-trifluoromethyl-17α-hydroxy-Δ⁴-pregnene-3,20-dione was substituted by 6α-fluoro-16α-trifluoromethyl-17α-hydroxy-Δ⁴-pregnene-3,20-dione (prepared in Example X), there were produced 6α-fluoro-16α-trifluoromethyl-17α-hydroxy-21-iodo-Δ⁴-pregnene-3,20-dione and 6α-fluoro-16α-trifluoromethyl-Δ⁴-pregnene-17α,21-diol-3,20-dione-21-acetate.

Upon treatment of the latter compound in methanol with potassium hydroxide as described in Example VI, there was obtained 6α-fluoro-16α-trifluoromethyl-Δ⁴-pregnene-17α,21-diol-3,20-dione.

EXAMPLE XIII

By applying the method of dehydrogenation described in Example V, 6α-fluoro-16α-trifluoromethyl-Δ⁴-pregnene-17α,21-diol-3,20-dione-21-acetate and the free alcohol thereof (described in the preceding example) were converted into the corresponding 1-dehydro derivatives.

EXAMPLE XIV

The methods described in Examples I through VII were repeated starting from the acetate of the 6-methyl derivative of $\Delta^{5,16}$-pregnadien-3$\beta$-ol-20-one. There were thus obtained 6-methyl-16$\alpha$-trifluoromethyl - 3,20 - diacetoxy-$\Delta^{5,17(20)}$-pregnadiene, 3,20-diacetoxy-6-methyl-16$\alpha$-trifluoromethyl-5,6; 17,20-bis-oxido-pregnane, 6-methyl-16$\alpha$-trifluoromethyl-$\Delta^5$-pregnene-3$\beta$,17$\alpha$-diol-20-one, 6$\alpha$-methyl - 16 - trifluoromethyl - 17$\alpha$ - hydroxy-$\Delta^4$-pregnene-3,20-dione, the 21-acetate of 6$\alpha$-methyl-16$\alpha$-trifluoromethyl-$\Delta^4$-pregnene-17$\alpha$,21-diol-3,20-dione, the 21-acetate of 6$\alpha$-methyl-16$\alpha$-trifluoromethyl-$\Delta^{1,4}$-pregnadiene - 17$\alpha$,21-diol-3,20-dione, 6$\alpha$-methyl-16$\alpha$-trifluoromethyl-$\Delta^4$-pregnene-17$\alpha$,21-diol-3,20-dione, and 6$\alpha$-methyl-16$\alpha$-trifluoromethyl-$\Delta^{1,4}$-pregnadiene-17$\alpha$-diol-3,20-dione.

EXAMPLE XV

A mixture of 10 g. of 16$\alpha$-trifluoromethyl-$\Delta^5$-pregnene-3$\beta$,17$\alpha$-diol-20-one (cf. Example II), 80 cc. of ethylene glycol, 2 liters of dry benzene and 1.5 g. of p-toluenesulfonic acid monohydrate was refluxed for 18 hours, using a Dean-Stark water separator. The cooled mixture was treated with 5% aqueous sodium bicarbonate, the organic phase was separated, washed with water, dried over anhydrous sodium sulfate and the solvent was evaporated. Crystallization of the residue from acetone afforded 16$\alpha$-trifluoromethyl-20-ethylenedioxy-$\Delta^5$-pregnene-3$\beta$,17$\alpha$-diol.

A solution of 8 g. of the above compound in 1600 cc. of methylene chloride was cooled to 0° C. and mixed with an ether solution of 4.0 g. of monoperphthalic acid. The mixture was kept at 0° C. for 16 hours, then diluted with water, the organic layer was separated, washed with aqueous sodium bicarbonate solution and then with water to neutrality, dried over anhydrous sodium sulfate and the solvent was evaporated. The residue was purified by crystallization from acetone-hexane. There was thus obtained 16$\alpha$-trifluoromethyl-5$\alpha$,6$\alpha$-oxido-20 - ethylenedioxy-pregnane-3$\beta$,17$\alpha$-diol.

A mixture of 5 g. of the above compound and 5 molar equivalents of methylmagnesium bromide in 500 cc. of dry benzene was refluxed for 3 hours, then poured under vigorous stirring into a mixture of 1 liter of 20% aqueous ammonium chloride solution and 1 kg. of ice. The benzene layer was separated, washed with water, dried over anhydrous sodium sulfate and the benzene was evaporated, finally under reduced pressure. The residue was treated with 100 mg. of p-toluenesulfonic acid monohydrate and 300 cc. of acetone and kept at room temperature for 16 hours, diluted with water and the solid collected, thus giving the crude 6$\beta$-methyl-16$\alpha$-trifluoromethyl-pregnane-3$\beta$,5$\alpha$,17$\alpha$-triol-20-one. The latter was oxidized with 8 N chromic acid, in accordance with the method described in Example III, to produce 6$\beta$-methyl-16$\alpha$-trifluoromethyl-pregnane-5$\alpha$,17$\alpha$-diol-3,20-dione, which, without further purification, was treated with 250 cc. of 1% methanolic potassium hydroxide under an atmosphere of nitrogen and at room temperature for 8 hours. After acidifying with acetic acid the mixture was concentrated to a small volume under reduced pressure and the product was precipitated by the addition of water. The solid was collected, washed with water and crystallized from acetone-hexane. There was thus obtained 6$\alpha$-methyl-16$\alpha$-trifluoromethyl-$\Delta^4$-pregnen-17$\alpha$-ol-3,20 - dione, identical with the intermediate of Example XIV.

EXAMPLE XVI 1 g. of 16$\alpha$-trifluoromethyl-17$\alpha$-hydroxy-$\Delta^4$-pregnene-3,20-dione (Example III) was allowed to react overnight at room temperature with 5 cc. of acetic anhydride and 1 g. of p-toluenesulfonic acid in 50 cc. of acetic acid. The mixture was then poured into ice water and the solid formed was collected, washed with water, dried and treated with 50 cc. of 1% methanolic potassium hydroxide, under an atmosphere of nitrogen, at 5° C. for 4 hours. It was acidified with acetic acid, concentrated to a small volume and the precipitate was collected, washed with water, dried and crystallized from acetone-hexane. There was thus obtained 16$\alpha$-trifluoromethyl-17$\alpha$-acetoxy-$\Delta^4$-pregnene-3,20-dione.

By following the procedure described above there was acetylated the 17$\alpha$-hydroxyl group of the 16$\alpha$-trifluoromethyl 16$\alpha$-fluoro and 6$\alpha$-methyl-16$\alpha$-trifluoromethyl derivatives of 17$\alpha$-hydroxy-$\Delta^4$-pregnene-3,20-dione.

EXAMPLE XVII

A mixture of 1 g. of 16$\alpha$-trifluoromethyl-17$\alpha$-hydroxy-$\Delta^4$-pregnene-3,20-dione, 3 g. of caproic anhydride, 100 cc. of anhydrous benzene and 500 mg. of p-toluenesulfonic acid monohydrate was kept at room temperature for 48 hours, then abundantly washed with 5% aqueous sodium bicarbonate solution and water, dried over anhydrous sodium sulfate and evaporated to dryness. Chromatography of the residue on neutral alumina followed by crystallization of the solid eluates from acetone-hexane afforded the caproate of 16$\alpha$-trifluoromethyl-17$\alpha$-hydroxy-$\Delta^4$-pregnene-3,20-dione.

By the same process there were prepared the caproates of 16$\alpha$-trifluoromethyl-6$\alpha$-fluoro-17$\alpha$-hydroxy-$\Delta^4$-pregnene-3,20-dione and of 16$\alpha$-trifluoromethyl-6$\alpha$-methyl-17$\alpha$-hydroxy-$\Delta^4$-pregnene-3,20-dione.

EXAMPLE XVIII

The reaction with trifluoromethyl magnesium iodide described in Example I was repeated starting from 5 g. of the acetate of $\Delta^{5,16}$-pregnadien-3$\beta$-ol-20-one, but without acetylating, the reaction mixture was poured into 1 l. of ice water containing 100 g. of ammonium chloride, the tetrahydrofuran was distilled and the aqueous residue extracted with several portions of ether. The extract was washed with water, dried over anhydrous sodium sulfate and the ether was evaporated. There was thus obtained 16$\alpha$-trifluoromethyl-$\Delta^5$-pregnene-3$\beta$-ol-20-one.

A solution of 3.3 g. of the above compound in 250 ml. of acetic anhydride containing 1.3 g. of p-toluenesulfonic acid was subjected to a slow distillation over a period of 5 hours, the residue was poured into ice water and the product was extracted with ether. The extract was consecutively washed with 5% aqueous sodium carbonate solution and water, dried over anhydrous sodium sulfate and the ether was evaporated. There was thus obtained the diacetate of 16$\alpha$-trifluoromethyl-$\Delta^{5,17(20)}$-pregnadiene-3$\beta$,20-diol, identical with the intermediate obtained in accordance with the method of Example I.

EXAMPLE XIX

The process described in the preceding example was applied to the acetate of 6-methyl-$\Delta^{5,16}$-pregnadien-3$\beta$-ol-20-one and there was isolated as an intermediate 6-methyl - 16$\alpha$ - trifluoromethyl - $\Delta^5$-pregnen-3$\beta$-ol-20-one, which was then converted into the diacetate of 6-methyl-16$\alpha$-trifluoro-methyl-$\Delta^{5,17(20)}$-pregnadiene-3$\beta$,20-diol, identical with the compound obtained in accordance with the method of Example XIV.

EXAMPLE XX

To 150 cc. of tetrahydrofuran containing approximately 3 g. of monofluoromethylmagnesium iodide was added a solution of 5 g. of the acetate of $\Delta^{5,16}$-pregnadien-3$\beta$-ol-20-one in 50 c. of tetrahydrofuran and 0.7 g. of cuprous chloride. The addition was effected under stirring over a period of 30 minutes, under an atmosphere of nitrogen and at a temperature between —20° and —10° C. The mixture was stirred for two more hours at 0° C.; it was cooled to —30° C. and 10 cc. of acetyl chloride were added. The temperature was allowed to reach 0° C. and the mixture was kept at this temperature for 20 minutes. There was then added 100 cc. of an aqueous saurated ammonium chloride solution followed by 30 cc. of aqueous concentrated sodium acetate solution. Extraction with methylene chloride followed by conventional purification 3.75 g. of 3$\beta$,20-diacetoxy-16$\alpha$-monofluoromethyl-$\Delta^{5,17(20)}$-pregnadiene.

For the next step there were combined several batches of the above compound.

A solution of 10 g. of 3β,20-diacetoxy-16α-monofluoromethyl-Δ$^{5,17(20)}$-pregnadien, in 100 cc. of ether, was treated with 300 cc. of a 1 N solution of monoperphthalic acid and the mixture was kept at room temperature for 3 days; at the end of this time it was consecutively washed with an aqueous solution of sodium chloride, sodium carbonate, sodium iodide and sodium thiosulfate and finally with sodium chloride; the ether solution was dried over anhydrous sodium sulfate and evaporated to dryness, thus yielding a mixture of 5α,6α; 17,20-bis-oxido-16α-monofluoromethyl-3,20-diacetoxy-pregnane and of its 5β,6β-isomer. This mixture was dissolved in 400 cc. of methanol, refluxed with 5.4 g. of potassium carbonate dissolved in 110 cc. of water, and refluxed for 1½ hours; the mixture was neutralized with acetic acid, concentrated in vacuum to ⅓ of its volume, poured into ice water and the precipitate formed was filtered and dried.

The above crude product was added to a mixture of 8.5 g. of sodium iodide, 2.8 g. of anhydrous sodium acetate, 8.5 g. of zinc dust, 33 cc. of acetic acid and 1.2 cc. of water; the mixture was stirred at room temperature for 3 hours, the zinc was removed by filtration and the solution was poured into ice water. The precipitate formed was collected, washed with water to neutrality, dried, dissolved in 200 cc. of hot dimethyl formamide, filtered through celite to remove traces of zinc and then hot water was added until crystallization; after cooling in ice and filtration, the precipitate was washed with methanol, and there was obtained 5 g. of 16α-monofluoromethyl-Δ$^5$-pregnen-3β,17α-diol-20-one.

EXAMPLE XXI 5 g. of the above compound were dissolved in 50 cc. of acetone cooled to 0° C., flushed with nitrogen and treated under stirring with 8 N chromic acid solution (as prepared in Example III) added in a thin stream, at 0° C., until the red color of chromium trioxide persisted in the mixture. After diluting the mixture with water the product was collected by filtration, washed with water and dried under vacuum.

The crude product was dissolved in 200 cc. of methanol and treated at room temperature with a solution of 0.5 g. of oxalic acid in 5 cc. of water. The mixture was kept standing for 3 hours, then treated with water and the product was collected by filtration, washed with water to neutral and dried. There was thus obtained 16α-monofluoromethyl-17α-hydroxy-Δ$^4$-pregnene-3,20-dione.

EXAMPLE XXII

To a solution of 3.9 g. of 16α-monofloromethyl-17α-hydroxy-Δ$^4$-pregnene-3,20-dione in 30 cc. of tetrahydrofurane and 18 cc. of methanol was added under vigorous stirring 6 g. of calcium oxide and then 6 g. of metallic iodine; the stirring was continued at room temperature until the color of the solution became pale yellow, and then the mixture was poured into ice water containing 15 cc. of acetic acid and 2.1 g. of sodium thiosulfate; the mixture was stirred for 15 minutes, most of the liquid was separated by decantation and the precipitate was collected, washed with water and dried under vacuum. There was thus obtained 16α-monofluoromethyl-17α-hydroxy-21-iodo-Δ$^4$-pregnene-3,20-dione.

The above substance was mixed with 25 cc. of anhydrous acetone and 4 g. of recently fused potassium acetate and refluxed for 8 hours, concentrated to a small volume under reduced pressure and diluted with water; the product was extracted with ether, washed with water, dried over anhydrous sodium sulfate and the ether was evaporated. Recrystallization of the residue from acetone-hexane yielded the 21-acetate of 16α-monofluoromethyl-Δ$^4$-pregnene-17α,21-diol-3,20-dione.

EXAMPLE XXIII

A mixture of 1.16 g. of the above compound, 120 cc. of t-butanol, 2 cc. of pyridine and 600 mg. of selenium dioxide was refluxed under an atmosphere of nitrogen for 72 hours; after cooling the mixture was diluted with ethyl acetate and filtered through celite; the filtrate was evaporated to dryness under reduced pressure, the residue was triturated with water and the solid collected, washed with water and dried. Recrystallization from methylene chloride-hexane afforded 420 mg. of the 21-acetate of 16α-monofluoromethyl - Δ$^{1,4}$ - pregnadiene - 17α,21 - diol - 3, 20-dione.

A solution of the above compound in 20 cc. of methanol was mixed with 4.6 cc. of a 1% solution of potassium hydroxide in water and stirred at 0° C. under an atmosphere of nitrogen for 1 hour; it was then neutralized with acetic acid and the methanol was distilled under reduced pressure. The residue was triturated with water and the solid was collected by filtration, washed with water, dried and recrystallized from ethyl acetate-methanol, thus giving approximately 375 mg. of 16α-monofluoromethyl-Δ$^{1,4}$-17α,21-diol-3,20-dione.

EXAMPLE XXIV

A solution of 4 g. of the acetate of 16α-monofluoromethyl-Δ$^4$-pregnene-17α,21-diol-3,20-dione, obtained in accordance with the method of Example XXII, in 150 cc. of methanol and 14 cc. of a 4% aqueous solution of potassium hydroxide was stirred for 1 hour under an atmosphere of nitrogen at 0° C.; the mixture was neutralized with acetic acid and the methanol was distilled under reduced pressure. The residue was triturated with water and the solid was collected, washed with water, dried and recrystallized from ethyl acetate-methanol, thus producing 3.0 g. of 16α-monofluoromethyl-Δ$^4$-pregnene-17α,21-diol-3,20-dione.

EXAMPLE XXV

To a polyethylene bottle containing 119 g. of anhydrous tetrahydrofuran was added 70 g. of anhydrous hydrogen fluoride. The mixture was cooled to −70° C. in a Dry Ice-acetone bath, and, under vigorous stirring there was added a mixture, previously cooled to −70° C., of 10 g. of 16α-monofluoromethyl-Δ$^5$-pregnene-3β,17α-diol-20-one (described in Example XX), and 5.0 g. of N-bromoacetamide in 350 ml. of anhydrous methylene chloride distilled over calcium chloride. The mixture was stirred at −70° C. for 5 hours, poured into aqueous saturated sodium carbonate solution and the precipitate was filtered. The organic layer was separated, the aqueous phase was extracted with several portions of methylene chloride and the extracts were combined, washed with water to neutrality, dried over anhydrous sodium sulfate, and evaporated to dryness under vacuum. The original precipitate and the residue of the evaporation were combined and crystallized from acetone, thus affording 9.3 g. of 16α-monofluoromethyl - 5α - bromo - 6β - fluoro - pregnane - 3β,17α-diol-20-one.

EXAMPLE XXVI

By applying the methods described in Examples IX through XI but substituting the 16α-trifluoromethyl compound by the corresponding 16α-monofluoromethyl compound described in the preceding example, there were obtained 6β-fluoro-16α-monofluoromethyl-Δ$^5$-pregnen-17α-ol-3,20-dione,
6β-fluoro-16α-monofluoromethyl-Δ$^4$-pregnen-17α-ol-3,20-dione,
6α-fluoro-16α-monofluoromethyl-Δ$^4$-pregnen-17α-ol-3,20-dione, and
6α-fluoro-16α-monofluoromethyl-Δ$^{1,4}$-pregnadien-17α-ol-3,20-dione.

EXAMPLE XXVII

By substituting in the procedure described in Example XXII the 16α-monofluoromethyl-17α-hydroxy-Δ⁴-pregnene-3,20-dione by 6α-fluoro-16α-monofluoromethyl-17α-hydroxy-Δ⁴-pregnene-3,20-dione, there was produced 6α-fluoro-16α-monofluoromethyl-17α-hydroxy-21-iodo-Δ⁴-pregnene-3,20-dione and
6α-fluoro-16α-monofluoromethyl-Δ⁴-pregnene-17α,21-diol-3,20-dione-21-acetate.

Upon treatment of the latter with methanolic potassium hydroxide as described in Example VI there was obtained 6α - fluoro - 16α - monofluoromethyl - Δ⁴ - pregnene - 17α,-21-diol-3,20-dione.

EXAMPLE XXVIII

By applying the method of dehydrogenation described in Example XXIII, 6α-fluoro-16α-monofluoromethyl-Δ⁴-pregnene-17α,21-diol-3,20-dione-21-acetate and the free alcohol thereof (described in the preceding example) were converted into the corresponding 1-dehydro derivatives.

EXAMPLE XXIX

The method of Examples XX through XXIII were repeated, starting from the acetate of the 6-methyl derivative of Δ⁵,¹⁶-pregnadien-3β-ol-20-one. Thus there were obtained:

6-methyl-16α-monofluoromethyl-3β,20-diacetoxy-Δ⁵,¹⁷⁽²⁰⁾-pregnadiene, the
3,20-diacetoxy-6-methyl-16α-monofluoromethyl-5,6; 17,20-bis-oxido-pregnane,
6-methyl-16α-monofluoromethyl-Δ⁵-pregnane-3β,17α-diol-20-one,
6α-methyl-16α-monofluoromethyl-17α-hydroxy-Δ⁴-pregnene-3,20-dione, the
21-acetate of 6α-methyl-16α-monofluoromethyl-Δ⁴-pregnene-17α,21-diol-3,20-dione, the
21-acetate of 6α-methyl-16α-monofluoromethyl-Δ¹,⁴-pregnadiene-17α,21-diol-3,20-dione and this last compound in form of the free alcohol.

EXAMPLE XXX

A mixture of 10 g. of 16α-monofluoromethyl-Δ⁵-pregnene-3β,17α-diol-20-one (cf. Example XX), 80 cc. of ethyleneglycol, 2 liters of dry benzene and 1.5 g. of monohydrated p-toluenesulfonic acid was refluxed for 18 hours, using a Dean-Stark water separator. The mixture was cooled, treated with a 15% aqueous solution of sodium bicarbonate; the organic layer was separated, washed with water and dried over anhydrous sodium sulfate and the solvents were evaporated. Crystallization of the residue from acetone-hexane afforded 16α-monofluoromethyl-20-ethylenedioxy-Δ⁵-pregnene-3β,17α-diol.

A solution of 8 g. of the above compound in 1600 cc. of methylene chloride was cooled to 0° C. and mixed with an ether solution of 4.0 g. of monoperphthalic acid. The mixture was kept at 0° C. for 16 hours, then diluted with water; the organic layer was separated, washed with aqueous sodium bicarbonate solution and then with water to neutrality, dried over anhydrous sodium sulfate and the solvent was evaporated. The residue was purified by crystallization from acetone-hexane. There was thus obtained 16α-monofluoromethyl-5α,6α-oxido-20-ethylenedioxy-pregnane-3β,17α-diol.

A mixture of 5 g. of the above compound and 5 molar equivalents of methylmagnesium bromide in 500 cc. of dry benzene was refluxed for 3 hours, then poured under vigorous stirring into a mixture of 1 liter of 20% aqueous ammonium chloride solution and 1 kg. of ice. The benzene layer was separated, the aqueous layer was extracted with benzene, both extracts were combined, washed with water, dried over anhydrous sodium sulfate and the benzene was evaporated, finally under reduced pressure. The residue was treated with 100 mg. of p-toluenesulfonic acid monohydrate and 300 cc. of acetone and kept at room temperature for 16 hours, diluted with water and the solid collected, thus giving the crude 6β-methyl-16α-monofluoromethylpregnane-3β,5α,17α - triol-20 - one. The latter was oxidized with 8 N chromic acid, in accordance with the method described in Example III, to produce 6β-methyl-16α-monofluoromethyl-pregnane-5α,17α-diol-3,20-dione, which, without further purification, was treated with 250 cc. of 1% methanolic potassium hydroxide under an atmosphere of nitrogen and at room temperature for 8 hours. After acidifying with acetic acid, the mixture was concentrated to a small volume under reduced pressure and the product was precipitated by the addition of water. The solid was collected, washed with water and crystallized from acetone-hexane. There was thus obtained 6α-methyl-16α-monofluoromethyl-Δ⁴-pregnen-17α-ol-3,20-dione, identical with the intermediate of Example XXIX.

EXAMPLE XXXI 1 g. of 16α-monofluoromethyl-17α-hydroxy-Δ⁴ - pregnene-3,20-dione (Example XXI) was allowed to react overnight at room temperature with 5 cc. of acetic anhydride and 1 g. of p-toluenesulfonic acid in 50 cc. of acetic acid. The mixture was then poured into ice water and the solid formed was collected, washed with water, dried and treated with 50 cc. of 1% methanolic potassium hydroxide, under an atmosphere of nitrogen, at 5° C. for 4 hours. It was acidified with acetic acid, concentrated to a small volume and the precipitate was collected, washed with water, dried and crystallized from acetone-hexane. There was thus obtained 16α-monofluoromethyl-17α-acetoxy-Δ⁴-pregnene-3,20-dione.

By following the methods described above there was acetylated the 17α-hydroxyl group of the 16α-monofluoromethyl-6α-fluoro and 6α-methyl-16α - monofluoromethyl derivatives of 17α-hydroxy-Δ⁴-pregnene-3,20-dione.

EXAMPLE XXXII

A mixture of 1 g. of 16α-monofluoromethyl-17α-hydroxy-Δ⁴-pregnene-3,20-dione, 3 g. of caproic anhydride, 100 cc. of anhydrous benzene and 500 mg. of p-toluenesulfonic acid monohydrate was kept at room temperature for 48 hours, then abundantly washed with 5% aqueous sodium bicarbonate solution and then with water, dried over anhydrous sodium sulfate and evaporated to dryness. Chromatography of the residue on neutral alumina followed by crystallization of the solid eluates from acetone-hexane afforded the caproate of 16α-monofluoromethyl-17α-hydroxy-Δ⁴-pregnene-3,20-dione.

By the same method there were prepared the caproates of 16α-monofluoromethyl-6α-fluoro-17α-hydroxy-Δ⁴-pregnene-3,20-dione and of 16α-monofluoromethyl-6α-methyl-17α-hydroxy-Δ⁴-pregnene-3,20-dione.

EXAMPLE XXXIII

The reaction with monofluoromethyl magnesium iodide described in Example XX was repeated, starting from 5 g. of the acetate of Δ⁵,¹⁶-pregnadien-3β-ol-20-one, but without acetylating, the reaction mixture was poured into 1 l. of ice water containing 100 g. of ammonium chloride, the tetrahydrofuran was distilled and the aqueous residue extracted with several portions of ether. The extract was washed with water, dried over anhydrous sodium sulfate and the ether was evaporated. There was thus obtained 16α-monofluoromethyl-Δ⁵-pregnen-3β-ol-20-one.

A solution of 3.3 g. of the above-mentioned compound in 250 ml. of acetic anhydride containing 1.3 g. of p-toluenesulfonic acid was subjected to a slow distillation over a period of 5 hours, the residue was poured into ice water, and the product was extracted with ether. The extract was consecutively washed with 5% aqueous sodium carbonate solution and water, dried over anhydrous sodium sulfate and the ether was evaporated. Thus there was obtained the diacetate of 16α-monofluoromethyl-Δ⁵,¹⁷⁽²⁰⁾-pregnadien-3β,20-diol, identical with the intermediate obtained in accordance with the method of Example XX.

EXAMPLE XXXIV

The process described in Example XXXIII was applied to the acetate of 6-methyl-$\Delta^{5,16}$-pregnadien-3$\beta$-ol-20-one and there was isolated as an intermediate 6-methyl-16$\alpha$-monofluoromethyl-$\Delta^5$-pregnen-3$\beta$-ol-20-one which was then converted into the diacetate of 6-methyl-16$\alpha$-monofluoromethyl-$\Delta^{5,17(20)}$-pregnadien-3$\beta$,20-diol, identical with the compound obtained in accordance with the method of Example XXIX.

EXAMPLE XXXV

A solution of 5 g. of 16$\alpha$-trifluoromethyl-$\Delta^5$-pregnene-3$\beta$,17$\alpha$-diol-20-one, obtained as described in Example II in 500 cc. of methylene chloride was cooled to 0° C. and mixed with 1.5 molar equivalents of monoperphthalic acid in ether solution. The mixture was kept at 0° C. for 20 hours, diluted with water, the organic layer was separated, washed with aqueous sodium bicarbonate solution and then with water to neutral, dried over anhydrous sodium sulfate and evaporated to dryness. Crystallization from acetone-hexane gave 3.75 g. of the pure 16$\alpha$-trifluoromethyl-5$\alpha$,6$\alpha$-oxido-pregnan-3$\beta$,17$\alpha$-diol-20-one.

A solution of 3 g. of the above compound in 300 cc. of glacial acetic acid was treated with 6 cc. of concentrated hydrochloric acid and the mixture kept at room temperature for 6 hours. Aftre dilution with ice-salt water, and filtration of the formed precipitate there was obtained 16$\alpha$-trifluoromethyl-6$\beta$-chloro-pregnane-3$\beta$,5$\alpha$,17$\alpha$-triol-20-one. Upon oxidation with 8 N chromic acid solution by following the method of Example III, there was obtained 16$\alpha$-trifluoromethyl-6$\beta$-chloro-pregnane-5$\alpha$,17$\alpha$-diol-3,20-dione.

A slow stream of dry hydrogen chloride was introduced for 4 hours into a solution of 1 g. of the above compound in 100 cc. of glacial acetic acid, maintaining the temperature around 20° C.; the mixture was poured into ice water and the precipitate collected by filtration, washed with water, dried and recrystallized from acetone-ether thus yielding 6$\alpha$-chloro-16$\alpha$-trifluoromethyl-$\Delta^4$-pregnen-17$\alpha$-ol-3,20-dione. By following the procedure of Example XVI there was obtained the corresponding acetate.

EXAMPLE XXXVI

A mixture of 1.5 g. of the above compound, 120 cc. of tertiary butanol, 2 cc. of pyridine and 600 mg. of selenium dioxide was refluxed under an atmosphere of nitrogen for 72 hours. After cooling, the mixture was diluted with ethyl acetate and filtered through celite; the filtrate was evaporated to dryness under reduced pressure, the residue was triturated with water and the solid collected, washed with water and dried. Recrystallization from methylene chloride-hexane afforded 6$\alpha$-chloro-16$\alpha$-trifluoromethyl-$\Delta^{1,4}$-pregnadien-17$\alpha$-ol-3,20-dione. Treatment of this compound with caproic anhydride in benzene solution and in the presence of p-toluene sulfonic acid gave the corresponding caproate.

EXAMPLE XXXVII

To a solution of 1 g. of 6$\alpha$-chloro-16$\alpha$-trifluoromethyl-17$\alpha$-hydroxy-$\Delta^4$-pregnene-3,20-dione in 7.5 cc. of tetrahydrofurane and 4.5 cc. of methanol was added under vigorous stirring 1.6 g. of calcium oxide and then 1.6 g. of iodine; the stirring was continued at room temperature until the color of the solution became pale yellow and then the mixture was poured into ice water containing 4 cc. of acetic acid and 5 g. of sodium thiosulfate, stirred for 15 minutes, most of the liquid was separated by decantation and the precipitate was collected, washed with water and dried under vacuum. There was thus obtained 6$\alpha$-chloro-16$\alpha$-trifluoromethyl-17$\alpha$-hydroxy-21-iodo-$\Delta^4$-pregnene-3,20-dione.

The above substance was mixed with 50 cc. of anhydrous acetone and 4 g. of recently fused potassium acetate and refluxed for 8 hours, concentrated to a small volume under reduced pressure and diluted with water; the product separated by filtration and recrystallized from acetone-hexane yielded the 21-acetate of 6$\alpha$-chloro-16$\alpha$-trifluoromethyl-$\Delta^4$-pregnene-17$\alpha$,21-diol-3,20-dione.

EXAMPLE XXXVIII

A mixture of 500 mg. of the above compound, 50 cc. of t-butanol, 0.75 cc. of pyridine and 200 mg. of selenium dioxide was refluxed under an atmosphere of nitrogen for 72 hours; after cooling the mixture was diluted with ethyl acetate and filtered through celite; the filtrate was evaporated to dryness under reduced pressure, the residue was triturated with water and the solid collected, washed with water and dried. Recrystallization from methylene chloride-hexane afforded 260 mg. of the 21-acetate of 6$\alpha$-chloro-16$\alpha$-trifluoromethyl-$\Delta^{1,4}$-pregnadiene-17$\alpha$,21-diol-3,20-dione.

EXAMPLE XXXIX

A solution of the above compound in 10 cc. of methanol was mixed with 1.5 cc. of a 1% solution of potassium hydroxide in water and stirred at 0° C. under an atmosphere of nitrogen for 1 hour; it was then neutralized with acetic acid and the methanol was distilled under reduced pressure. The residue was triturated with water and the solid was collected, washed with water, dried and recrystallized from ethyl acetate-methanol, thus giving 6$\alpha$-chloro-16$\alpha$-trifluoromethyl-$\Delta^{1,4}$-pregnadiene-17$\alpha$,21-diol-3,20-dione.

EXAMPLE XL

A mixture of 1 g. of 16$\alpha$-trifluoromethyl-17$\alpha$-hydroxy-$\Delta^4$-pregnene-3,20-dione, 2 g. of chloranil and 50 cc. of terbutanol was refluxed for 8 hours. The mixture was cooled, the excess of chloranil filtered and washed with ethyl acetate and the organic extracts washed with a cold aqueous solution of 10% sodium hydroxide until the washings were colorless. It was then dried over anhydrous sodium sulfate and the ethyl acetate was evaporated. Recrystallization from methylene chloride ether, after decloroization with 2 parts of alumina, gave 16$\alpha$-trifluoromethyl-$\Delta^{4,6}$-pregnadien-17$\beta$-ol-3,20-dione.

Treatment of the above compunud with selenium dioxide in t-butanol solution and in the presence of pyridine in accordance with the method of Example V gave 16$\alpha$-trifluoromethyl-$\Delta^{1,4,6}$-pregnatrien-17$\beta$-ol-3,20-dione.

EXAMPLE XLI

The process described in the preceding example was applied to the acetate of 16$\alpha$-trifluoromethyl-$\Delta^4$-pregnene-17$\alpha$,21-diol-3,20-dione, thus producing 16$\alpha$-trifluoromethyl-$\Delta^{4,6}$-pregnadien-17$\alpha$,21-diol-3,20-dione 21-acetate and 16$\alpha$-trifluoro-methyl-$\Delta^{1,4,6}$-pregnatrien-17$\alpha$,21-diol-3,20-dione 21-acetate. Upon treatment of the latter compound in methanol with potassium hydroxide, as described in Example VI, there was obtained 16$\alpha$-trifluoromethyl-$\Delta^{1,4,6}$-pregnatriene-17$\alpha$,21-diol-3,20-dione.

EXAMPLE XLII

By following the method of Example XL, 3 g. of 16$\alpha$-monofluoromethyl-17$\alpha$-hydroxy-$\Delta^4$-pregnene-3,20-dione obtained in Example XXI was converted into 16$\alpha$-monofluoromethyl-$\Delta^{4,6}$-pregnadien-17$\alpha$-ol-3,20-dione and 16$\alpha$-monofluoromethyl-$\Delta^{1,4,6}$-pregnatrien-17$\alpha$-ol-3,20-dione.

EXAMPLE XLIII

A mixture of 1 g. of 6$\alpha$-fluoro-16$\alpha$-trifluoromethyl-$\Delta^4$-pregne-17$\alpha$-ol-3,20-dione, 2 g. of chloranil, 15 cc. of ethyl acetate and 5 cc. of acetic acid was refluxed under an atmosphere of nitrogen for 96 hours. The mixture was cooled, washed with a cold aqueous solution of 10% sodium hydroxide until the washings were colorless, the organic solution was dried over anhydrous sodium sulfate and the ethyl acetate was evaporated. By chromatography of the residue on neutral alumina there was obtained the 6-fluoro-16$\alpha$-trifluoromethyl-$\Delta^{4,6}$-pregnadien-17$\alpha$-ol-3,20-dione.

In a similar manner, 6α-methyl-16α-trifluoromethyl-Δ⁴-pregnen-17α-ol-3,20-dione and 6α-chloro-16α-trifluoromethyl-Δ⁴-pregnen-17α-ol-3,20-dione were converted into the corresponding 6-dehydro derivatives, namely 6-methyl-16α-trifluoromethyl-Δ⁴,⁶-pregnadien-17α-ol-3,20-dione and 6-chloro-16α-trifluoromethyl-Δ⁴,⁶-pregnadien-17α-ol-3,20-dione. Following the esterification method of Examples XVI and XVII, there were obtained 6-methyl-16α-trifluoromethyl-Δ⁴,⁶-pregnadien-17α-ol-3,20-dione-17-acetate and 6-chloro-16α-trifluoromethyl-Δ⁴,⁶-pregnadien-17α-ol-3,20-dione 17α-acetate, and the corresponding caproates.

EXAMPLE XLIV

By following the method of the preceding example 6α-fluoro-16α-trifluoromethyl-Δ⁴-pregnene-17α,21-diol-3,20-dione 21-acetate obtained in Example XII and the corresponding Δ¹-dehydro derivative (cf. Example XIII) were converted respectively into 6-fluoro-16α-trifluoromethyl-Δ⁴,⁶-pregnadiene-17α,21-diol-3,20-dione 21-acetate and 6-fluoro-16α-trifluoromethyl-Δ¹,⁴,⁶-pregnatriene-17α,21-diol-3,20-dione 21-acetate.

EXAMPLE XLV

By following the method of Example XLIII, 6α-chloro-16α-trifluoromethyl-Δ⁴-pregnene-17α,21-diol-3,20-dione 21-monoacetate and 6α-chloro-16α-trifluoromethyl-Δ¹,⁴-pregnadiene-17α,21-diol-3,20-dione were converted into 6-chloro-16α-trifluoromethyl-Δ⁴,⁶-pregnadiene-17α,21-diol-3,20-dione 21-acetate and 6-chloro-16α-trifluoromethyl-Δ¹,⁴,⁶-pregnatrien-17α,21-diol-3,20-dione.

EXAMPLE XLVI

A solution of 5 g. of 16α-monofluoromethyl-17α-hydroxy-Δ⁴-pregnene-3,20-dione obtained as described in Example XXII in 40 cc. of peroxide-free dioxane and 5 cc. of freshly distilled ethyl orthoformate was treated with 150 mg. of p-toluenesulfonic acid and the mixture stirred for 1 hour at room temperature. 0.8 cc. of pyridine was added and then poured into ice-salt water, the precipitate was collected and washed with water containing a few drops of pyridine, thus giving 16α-monofluoromethyl-3-ethoxy-Δ3,5-pregnadien-17α-ol-20-one.

A mixture of the above enol ether, 2 g. of anhydrous sodium acetate, 100 cc. of acetone and 20 cc. of water was cooled to a temperature between 0 and 5° C.; there was then added 1.1 molar equivalents of N-chlorosuccinimide and 2 cc. of glacial acetic acid and the mixture was stirred between 0 and 5° C. for 30 minutes. It was then diluted with ice-salt water, kept standing overnight in the refrigerator and the precipitate formed was collected, washed with water, dried under vacuum and recrystallized from acetone. There was thus obtained a 6β-chloro-16α-monofluoromethyl-Δ⁴-pregnen-17α-ol-3,20-dione.

Into a solution of 1 g. of the above compound in 50 cc. of glacial acetic acid was passed a slow stream of dry hydrogen chloride for 4 hours, while maintaining the temperature around 15° C.; the mixture was then poured into ice-water, the precipitate was collected, washed with water, dried and recrystallized from acetone-hexane to give 6α-chloro-16α-monofluoromethyl-Δ⁴-pregnen-17α-ol-3,20-dione.

EXAMPLE XLVII 1 g. of 6α-chloro-16α-monofluoromethyl-Δ⁴-pregnen-17α-ol-3,20-dione was treated with acetic anhydride, in accordance with the method of Example XVI, thus giving 6α-chloro-16α-monofluoromethyl-Δ⁴-pregnen-17α-ol-3,20-dione acetate.

A mixture of 1 g. of the above compound, 2 g. of chloranil and 50 cc. of terbutanol was refluxed for 8 hours. The mixture was cooled, the excess of chloranil filtered and washed with ethyl acetate and the organic extracts washed with a cold aqueous solution of 10% sodium hydroxide until the washings were colorless. It was then dried over anhydrous sodium sulfate and the ethyl acetate was evaporated. Recrystallization from methylene chloride ether, after decolorization with 2 parts of alumina, gave the acetate of 6-chloro-16α-monofluoromethyl-Δ⁴,⁶-pregnadien-17α-ol-3,20-dione.

EXAMPLE XLVIII

By following the methods of Examples IV, V, and VI, 5 g. of 6α-chloro-16α-monofluoromethyl-Δ⁴-pregnen-17α-ol-3,20-dione were converted into 6α-chloro-16α-monofluoromethyl-17α-hydroxy-21-iodo-Δ⁴-pregnene-3,20-dione, 6α-chloro-16α-monofluoromethyl-Δ⁴-pregnene-17α,21-diol-3,20-dione 21-monoacetate, 6α-chloro-16α-monofluoromethyl-Δ¹,⁴-pregnadiene-17α,21-diol-3,20-dione 21-monoacetate and 6α-chloro-16α-monofluoromethyl-Δ¹,⁴-pregnadiene-17α,21-diol-3,20-dione.

EXAMPLE XLIX

In accordance with the method described in our copending patent application Serial No. 63,266, filed on even date, now U.S. Patent No. 3,151,132, 5 g. of 16α-cyano-Δ⁵-pregnen-3β-ol-20-one acetate described by J. Romo in Tetrahedron 3, 37 (1958) was reduced with sodium borohydride and the resulting 20-hydroxy derivative was etherified by reaction with dihydropyran in benzene solution and in the presence of p-toluenesulfonic acid. The thus formed 20β-tetrahydropyranyloxy-16α-cyano-Δ⁵-pregnen-3β-ol-acetate was hydrolized by refluxing with methanolic potassium hydroxide thus furnishing 20β-tetrahydropyranyloxy-Δ⁵-pregnen-3β-ol-16α-carboxylic acid. Upon treatment with benzoyl chloride in pyridine solution, there was obtained 3β-benzoyloxy-20β-tetrahydropyranyloxy-Δ⁵-pregnene-16α-carboxylic acid. Hydrolysis of the above compound with 2N hydrochloric acid, followed by treatment with acetic anhydride in pyridine gave 3β-benzoyloxy-20β-acetoxy-Δ⁵-pregnene-16α-carboxylic acid.

A mixture of 1 g. of the abovementioned carboxylic acid and 5 cc. of oxalyl chloride was refluxed under anhydrous conditions during 2 hours. The solution was evaporated in vacuum, 2 portions of dry benzene were added and reevaporated to eliminate traces of oxalyl chloride. The above crude acid chloride was dissolved in 20 cc. of anhydrous tetrahydrofuran, cooled to −75° C. in a Dry Ice-acetone bath and treated with a previously cooled solution of 600 mg. of lithium aluminum t-butoxide in 20 cc. of anhydrous tetrahydrofurane. The reaction mixture was kept at −75° C. for 1 hour and then at room temperature for 30 minutes, poured into ice water and extracted several times with ethyl acetate, washed with water to neutral, dried over anhydrous sodium sulfate and evaporated to dryness under vacuum. After chromatography there was obtained the 3-benzoate 20-acetate of Δ⁵-pregnene-3β,20β-diol-16α-carboxaldehyde.

EXAMPLE L

A solution of 500 mg. of the above aldehyde in 100 cc. of benzene was treated with 1 g. of sulfur tetrafluoride and the mixture kept in a sealed steel tube for 48 hours at room temperature, it was then poured carefully into ice water. An excess of sodium bicarbonate was added and the product extracted with methylene chloride. The extract was washed with water to neutral, dried and evaporated to dryness. After chromatography and crystallization of the solid fractions from acetonehexane there was obtained 16α-difluoromethyl-Δ⁵-pregnene-3β,20β-diol-3-benzoate-20-acetate.

For the next step there were combined several batches of the above compound. A solution of 5 g. of the above compound in 200 cc. of methanol was treated with 2.5 g. of potassium carbonate dissolved in 20 cc. of water and the mixture was kept at room temperature for 12 hours. The reaction mixture was neutralized with acetic acid and concentrated under vacuum to one-third its volume, poured into water, the formed precipitate filtered, washed with water to neutral and dried, thus giving 16α-difluoromethyl-Δ$^5$-pregnene-3β,20β-diol-3-benzoate.

The above crude product was dissolved in 100 cc. of acetone, cooled to 0° C. and treated dropwise under an atmosphere of nitrogen under stirring with an 8 N chromic acid solution (prepared as in Example VII) until the color of the reagent persisted in the mixture, stirred for 10 minutes further at room temperature, diluted with water and the precipitate collected, washed with water and dried under vacuum, thus affording 16α-difluoromethyl-Δ$^5$-pregnen-3β-ol-20-one benzoate.

The crude benzoate was dissolved in 75 cc. of methanol and refluxed for 3 hours with 2 g. of potassium hydroxide, it was then poured into ice water, the precipitate collected, washed with water to neutral, dried and recrystallized from ethyl acetate-ether, thus giving 3.5 g. of 16α-difluoromethyl-Δ$^5$-pregnen-3β-ol-20-one.

EXAMPLE LI

A sloution of 3 g. of 16α-difluoromethyl-Δ$^5$-pregnen-3β-ol-20-one in 200 cc. of toluene and 50 cc. of cyclohexanone was dried by distilling off 30 cc. of the solvent, there was then added a solution of 3 g. of aluminum isopropoxide dissolved in 20 cc. of anhydrous toluene and the mixture was refluxed for 45 minutes, 10 cc. of acetic acid were added and the solvents removed by steam distillation. The product was extracted several times with ethyl acetate and the organic extracts washed with 5% hydrochloric acid solution, water, 10% sodium carbonate solution and water until neutral, dried over anhydrous sodium sulfate and evaporated until crystallization started. There was thus obtained 16α-difluoromethyl-progesterone.

EXAMPLE LII

A solution of 3.3 g. of 16α-difluoromethyl-Δ$^5$-pregnen-3β-ol-20-one 3-benzoate in 250 ml. of acetic anhydride containing 1.3 g. of p-toluenesulfonic acid was subjected to slow distillation over a period of 8 hours, the residue was poured into ice water and the product was extracted with ether. The extract was consecutively washed with 5% aqueous sodium carbonate solution and water, dried over anhydrous sodium sulfate and the ether was evaporated. There was thus obtained 16α-difluoromethyl-Δ$^{5,17(20)}$-pregnadiene-3β,20-diol-3-benzoate-20-acetate.

A solution of the above crude enol acetate in 30 cc. of ether was treated with 100 cc. of a 1 N solution of monoperphthalic acid and the mixture was kept at room temperature for 3 days; at the end of this time it was consecutively washed with dilute sodium chloride solution, sodium carbonate, sodium iodine, sodium thiosulfate and finally with sodium chloride solution; the ether solution was dried over anhydrous sodium sulfate and evaporated to dryness, thus yielding a mixture of 5α,6α-17,20-bis oxido-16α-difluoromethyl - 3β - benzoyloxy - 20-acetoxy-pregnane and of its 5β,6β-isomer. This mixture was dissolved in 150 cc. of methanol, treated with 1.5 g. of potassium hydroxide dissolved in 15 cc. of water and refluxed for 3 hours; the mixture was neutralized with acetic acid, concentrated to one-third its volume, poured into ice water and the precipitate formed was collected and dried.

The above crude product was added to a mixture of 2.8 g. of sodium iodide, 0.95 g. of anhydrous sodium acetate, 2.8 g. of zinc dust, 11 cc. of acetic acid and 0.4 cc. of water; the mixture was stirred at room temperature for 3 hours, the zinc was removed by filtration and the solution was poured into ice water. The precipitate formed was collected, washed with water to neutrality, dried, dissolved in 70 cc. of hot dimethyl-formamide, filtered through celite to remove traces of zinc and then hot water was added to crystallize the product; after cooling in ice the precipitate was collected by filtration and washed with methanol, thus affording 1.6 g. of 16α-difluoromethyl-Δ$^5$-pregnene-3β,17α-diol-20-one.

EXAMPLE LIII

A solution of 1.5 g. of the above compound in 20 cc. of acetone was oxidized with an 8 N chromic acid solution in accordance with the method of Example III; the crude product was dissolved in 50 cc. of methanol and treated at room temperature with a solution of 150 mg. of oxalic acid in 1.5 cc. of water. The mixture was kept standing for 3 hours, then treated with water and the product was collected by filtration, washed with water to neutral and dried. There was thus obtained 16α-difluoromethyl-17α-hydroxy-Δ$^4$-pregnene-3,20-dione.

Selenium dioxide oxidation of 500 mg. of the above compound, in accordance with the method of Example V, gave 16α-difluoromethyl-17α - hydroxy-Δ$^{1,4}$-pregnadiene-3,20-dione.

EXAMPLE LIV

A mixture of 500 mg. of 16α-difluoromethyl-17α-hydroxy-progesterone, 10 cc. of dioxane and 350 mg. of 2,3-dichloro-5,6-dicyano-1,4-benzoquinone was refluxed for 18 hours. It was then cooled, the 2,3-dichloro-5,6-dicyano-1,4-benzohydroquinone formed during the reaction filtered off, and the filtrate evaporated to dryness. The residue was dissolved in acetone and filtered through 10 g. of alumina. Crystallization from acetone-hexane gave 16α-difluoromethyl - 17α - hydroxy-Δ$^{1,4}$-pregnadiene-3,20-dione, identical with that obtained in the preceding example.

EXAMPLE LV

By following the methods of Examples IV, V and VI, 1 g. of 16α-difluoromethyl-17α-hydroxy-Δ$^4$-pregnene-3,20-dione was converted into 16α-difluoromethyl-Δ$^4$-pregnene-17α,21 - diol - 3,20 - dione 21-monoacetate, 16α-difluoromethyl-Δ$^{1,4}$-pregnadiene-17α,21-diol-3,20-dione 21-monoacetate and 16α-difluoromethyl-Δ$^{1,4}$-pregnadiene-17α,21-diol-3,20-dione.

EXAMPLE LVI

A mixture of 1 g. of 16α-difluoromethyl-17α-hydroxy-Δ$^4$-pregnene-3,20-dione, 3 g. of cyclopentylpropionic anhydride, 100 cc. of anhydrous benzene and 500 mg. of p-toluenesulfonic acid monohydrate was kept at room temperature for 48 hours, then abundantly washed with 5% aqueous sodium bicarbonate solution and water, dried over anhydrous sodium sulfate and evaporated to dryness. Chromatography of the residue on neutral alumina followed by crystallization of the solid eluates from acetone-hexane afforded the cyclopentylpropionate of 16α-difluoromethyl-17α-hydroxy-Δ$^4$-pregnene-3,20-dione.

The above compound was treated with chloranil in t-butanol, in accordance with the method of Example XL thus giving the cyclopentylpropionate of 16α-difluoromethyl-Δ$^{4,6}$-pregnadien-17α-ol-3,20-dione.

EXAMPLE LVII

By following the methods of Example VIII, IX and X, 1 g. of 16α-difluoromethyl-Δ$^5$-pregnene-3β,17α-diol-20-one, obtained in Example LII, was converted into 6α-fluoro-16α-difluoromethyl-Δ$^4$-pregnen-17α-ol-3,20-dione.

500 mg. of the above compound were treated with 1.3 molar equivalents of 2,3-dichloro-5,6-dicyano-1,4-benzoquinone, in accordance with the method of Example LIV, thus affording 6α-fluoro-16α-difluoromethyl-Δ$^{1,4}$-pregnadien-17α-ol-3,20-dione.

EXAMPLE LVIII

By following the method of Example XXX, 3 g. of 16α-difluoromethyl - Δ$^5$ - pregnene-3β,17α-diol-20-one obtained as described in Example LII, was converted in 6α-methyl-16α-difluoromethyl-Δ$^4$-pregnen - 17α - ol - 3,20-dione.

A mixture of 1 g. of the above compound, 3 cc. of propionic anhydride, 75 cc. of anhydrous benzene and 500 mg. of p-toluenesulfonic acid was kept at room temperature for 48 hours. After the usual work-up, including chromatography, there was obtained the propionate of 6α-methyl-16α-trifluoromethyl-Δ⁴-pregnen-17α-ol-3,20-dione. By following the method of Example XLVII the above compound was converted into 6-methyl-16α-trifluoromethyl-Δ⁴,⁶-pregnadien-17α-ol-3,20-dione propionate.

EXAMPLE LIX

By applying the method of Example XLVI, 2 g. of 16α-difluoromethyl-17α-hydroxy-progesterone, obtained as described in Example LII was converted into 16α-difluoromethyl-3-ethoxy-Δ³,⁵-pregnadien-17α-ol-20-one, 6β-chloro-16α-difluoromethyl-Δ⁴-pregnen-17α-ol-3,20-dione and 6α-chloro-16α-difluoromethyl-Δ⁴-pregnen-17α-ol-3,20-dione.

Treatment of the above compound with chloranil in accordance with the method of Example XLVII gave 6-chloro-16α-difluoromethyl-Δ⁴,⁶-pregnadien-17α-ol-3,20-dione. By following the esterification method of Example XVI there was obtained 6-chloro-16α-difluoromethyl-Δ⁴,⁶-pregnadien-17α-ol-3,20-dione acetate.

EXAMPLE LX

To a solution of 1 g. of 6α-methyl-16α-difluoromethyl-17α-hydroxy-Δ⁴-pregnene-3,20-dione in 75 cc. of tetrahydrofurane and 4.5 g. of methanol was added under vigorous stirring, 1.6 g. of calcium oxide and then 1.6 g. of iodine; the stirring was continued at room temperature until the color of the solution became pale yellow and then the mixture was poured into ice water containing 4 cc. of acetic acid and 500 mg. of sodium thiosulfate, stirred for 15 minutes, most of the liquid was separated by decantation and the precipitate was collected, washed with water and dried under vacuum. There was thus obtained 6α-methyl - 16α-difluoromethyl-17α-hydroxy-21-iodo-Δ⁴-pregnene-3,20-dione.

The above substance was mixed with 50 cc. of anhydrous acetone and 3 g. of recently fused potassium acetate and refluxed for 8 hours, concentrated to a small volume under reduced pressure and diluted with water; the product was extracted with ether, washed with water, dried over anhydrous sodium sulfate and the ether was evaporated. Recrystallization of the residue from acetone-hexane yielded the 21-acetate of 6α-methyl-16α-difluoromethyl-Δ⁴-pregnene-17α,21-diol-3,20-dione.

By the same method, the 6α-fluoro and 6α-chloro derivatives of 16α - difluoromethyl-17α-hydroxy-Δ⁴-pregnene-3,20-dione were converted respectively into 6α-fluoro-16α-difluoromethyl-Δ⁴-pregnen-17α,21-diol-3,20-dione 21-monoacetate and 6α-chloro-16α-difluoromethyl-Δ⁴-pregnen-17α,21-diol-3,20-dione 21-monoacetate.

EXAMPLE LXI

A solution of 500 mg. of the 21-acetate of 6α-chloro-16α-difluoromethyl-Δ⁴-pregnene-17α,21-diol-3,20-dione in 20 cc. of methanol was mixed with 5.0 cc. of a 1% solution of potassium hydroxide in water and stirred at 0° C. under an atmosphere of nitrogen for 1 hour; it was then neutralized with acetic acid and the methanol was distilled under reduced pressure. The residue was triturated with water and the solid was collected, washed with water, dried and recrystallized from ethyl acetate-methanol, thus giving approximately 430 mg. of 6α-chloro-16α-difluoromethyl-Δ⁴-pregnene-17α,21-diol-3,20-dione. In the same manner, 6α-fluoro-16α-difluoromethyl-Δ⁴-pregnene-17α,21-diol-3,20-dione 21-acetate and 6α-methyl-16α-difluoromethyl-Δ⁴-pregnene-17α,21-diol-3,20-dione 21 - monoacetate were converted into the corresponding free compounds.

EXAMPLE LXII

In accordance with the method of Example V, 1 g. of the 21-acetate of 6α-methyl-16α-difluoromethyl-Δ⁴-pregnene-17α,21-diol-3,20-dione was treated with selenium dioxide to give the 21-acetate of 6α-methyl-16α-difluoromethyl-Δ¹,⁴-pregnadiene-17α,21 - diol - 3,20-dione. Upon treatment of the above compound with chloranil in mixture with ethyl acetate and acetic acid in accordance with the method of Example XLIII there was obtained 6-methyl - 16α - difluoromethyl - Δ¹,⁴,⁶ - pregnatriene-17α,21-diol-3,20-dione 21-acetate.

EXAMPLE LXIII

By following the esterification method of Example XVII, 1 g. of 6α-fluoro-16α-difluoromethyl-Δ⁴-pregnen-17α-ol-3,20-dione obtained as described in Example LVII was converted into the corresponding caproate. Upon treatment with chloranil in terbutanol, in accordance with the method of Example XLVII, there was obtained the caproate of 6-fluoro-16α-difluoromethyl-Δ⁴,⁶-pregnadien-17α-ol-3,20-dione.

EXAMPLE LXIV

By following the method of Example XXXV, 16α-monofluoromethyl - Δ⁵ - pregnene-3β,17α-diol-20-one, obtained as described in Example XX, was converted into 6α - chloro -16α-monofluoromethyl-Δ⁴-pregen-17α-ol-3,20-dione. Chloranil dehydrogenation of the above compound, in accordance with the method of Example XLIII gave 6-chloro-16α-monofluoromethyl-Δ⁴,⁶-pregnadien-17α-ol-3,20-dione.

The above compound was acetylated in accordance with the method of Example XVI, thus affording 6-chloro-16 - monofluoromethyl-Δ⁴,⁶-pregnadien-17 - ol - 3,20-dione acetate.

EXAMPLE LXV

In accordance with the method of Example XLVII, 6α-fluoro and 6α-methyl derivatives of 16α-monofluoromethyl-17α-acetoxy-Δ⁴-pregnene-3,20-dione, obtained as described in Example XXXI, were converted into 6-fluoro-16α - monofluoromethyl-Δ⁴,⁶-pregnadien-17α-ol-3,20-dione acetate and 6 - methyl - 16α-monofluoromethyl-Δ⁴,⁶-pregnadien-17α-ol-3,20-dione acetate.

We claim:
1. A compound of the following formula:

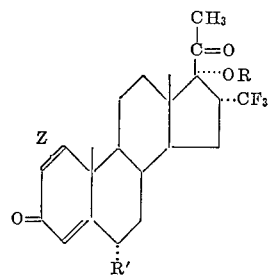

wherein R is selected from the group consisting of hydrogen and a hydrocarbon carboxylic acyl group containing less than 12 carbon atoms; R' is selected from the group consisting of hydrogen, methyl, fluorine and chlorine and Z is selected from the group consisting of a double bond between C–1 and C–2 and a saturated linkage between C–1 and C–2.

2. A compound of the folowing formula:

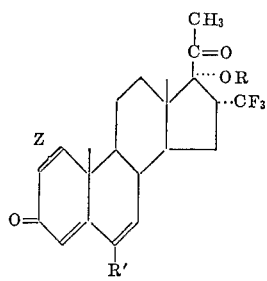

wherein R is selected from the group consisting of hydrogen and a hydrogen carboxylic acyl group containing less than 12 carbon atoms; R' is selected from the group consisting of hydrogen, methyl, fluorine and chlorine and Z is selected from the group consisting of a double bond between C–1 and C–2 and a saturated linkage between C–1 and C–2.

3. 6-methyl-16α-trifluoromethyl-Δ⁴,⁶-pregnadien - 17α-ol-3,20-dione propionate.

4. A compound of the following formula:

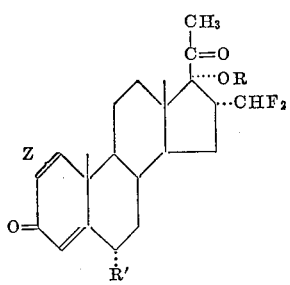

wherein R is selected from the group consisting of hydrogen and a hydrocarbon carboxylic acyl group containing less than 12 carbon atoms; R' is selected from the group consisting of hydrogen, methyl, fluorine and chlorine and Z is selected from the group consisting of a double bond between C–1 and C–2 and a saturated linkage between C–1 and C–2.

5. A compound of the following formula:

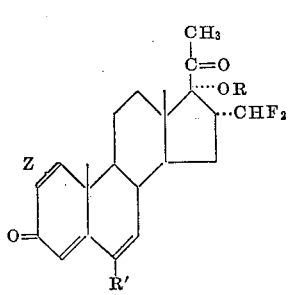

wherein R is selected from the group consisting of hydrogen and a hydrocarbon carboxylic acyl group containing less than 12 carbon atoms; R' is selected from the group consisting of hydrogen, methyl, fluorine and chlorine and Z is selected from the group consisting of a double bond between C–1 and C–2 and a saturated linkage between C–1 and C–2.

6. 6 - chloro - 16α-difluoromethy-Δ⁴,⁶-pregnadien-17α-ol-3,20-dione-17-acetate.

7. 6 - fluoro-16α-difluoromethyl-Δ⁴,⁶-pregnadien-17α-ol-caproate.

8. A compound of the following formula:

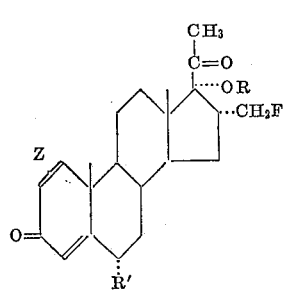

wherein R is selected from the group consisting of hydrogen and a hydrocarbon carboxylic acyl group containing less than 12 carbon atoms; R' is selected from the group consisting of hydrogen, methyl, fluorine and chlorine and Z is selected from the group consisting of a double bond between C–1 and C–2 and a saturated linkage between C–1 and C–2.

9. A compound of the following formula:

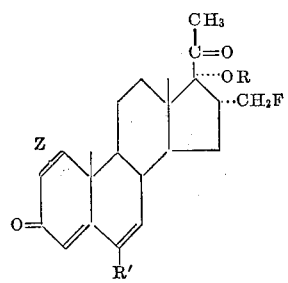

wherein R is selected from the group consisting of hydrogen and a hydrocarbon carboxylic acyl group containing less than 12 carbon atoms; R' is selected from the group consisting of hydrogen, methyl, fluorine and chlorine and Z is selected from the group consisting of a double bond between C–1 and C–2 and a saturated linkage between C–1 and C–2.

10. 6-methyl - 16α-monofluoromethyl-Δ⁴,⁶-pregnadien-17α-ol-3,20-dione acetate.

11. 6 - chloro-16α-monofluoromethyl-Δ⁴,⁶-pregnadien-17α-ol-3,20-dione acetate.

12. 6 - fluoro-16α-monofluoromethyl-Δ⁴,⁶-pregnadien-17α-ol-3,20-dione acetate.

13. A compound of the following formula:

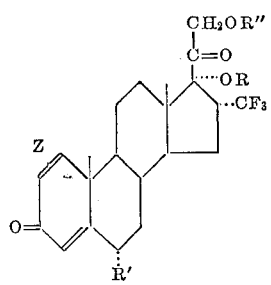

wherein R and R" are selected from the group consisting of hydrogen and a hydrocarbon carboxylic acyl group containing less than 12 carbon atoms; R' is selected from the group consisting of hydrogen, methyl, fluorine and chlorine and Z is selected from the group consisting of a double bond between C–1 and C–2 and a saturated linkage between C–1 and C–2.

14. 6α - methyl - 16α-trifluoromethyl-Δ¹,⁴-pregnadiene-17α,21-diol-3,20-dione.

15. 6α - fluoro - 16α-trifluoromethyl-Δ¹,⁴-pregnadiene-17α,21-diol-3,20-dione.

16. A compound of the following formula:

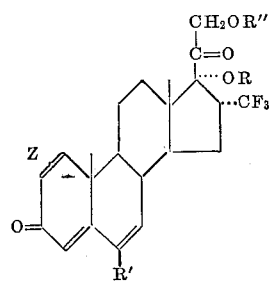

wherein R and R" are selected from the group consisting of hydrogen and a hydrocarbon carboxylic acyl group containing less than 12 carbon atoms; R' is selected from the group consisting of hydrogen, methyl, fluorine and chlorine and Z is selected from the group consisting of a double bond between C–1 and C–2 and a saturated linkage between C–1 and C–2.

17. A compound of the following formula:

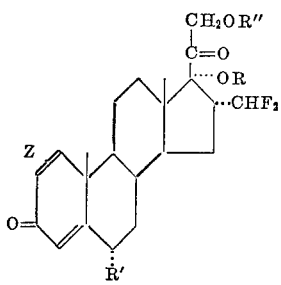

wherein R and R" are selected from the group consisting of hydrogen and a hydrocarbon carboxylic acyl group containing less than 12 carbon atoms, R' is selected from the group consisting of hydrogen, methyl, fluorine and chlorine and Z is selected from the group consisting of a double bond between C–1 and C–2 and a staurated linkage between C–1 and C–2.

18. 6α - fluoro - 16α-difluoromethyl-Δ$^{1,4}$-pregnadiene-17α,21-diol-3,20-dione.

19. A compound of the following formula:

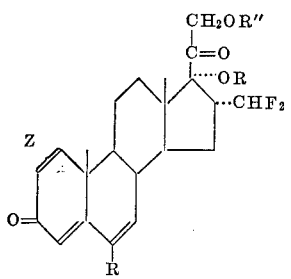

wherein R and R" are selected from the group consisting of hydrogen and a hydrocarbon carboxylic acyl group containing less than 12 carbon atoms; R' is selected from the group consisting of hydrogen, methyl, fluorine and chlorine and Z is selected from the group consisting of a double bond between C–1 and C–2 and a saturated linkage between C–1 and C–2.

20. 6α - fluoro-16α-difluoromethyl-Δ$^4$-pregnene-17α,21-diol-3,20-dione.

21. 6α - chloro-16α-difluoromethyl-Δ$^4$-pregnene-17α,21-diol-3,20-dione.

22. A compound of the following formula:

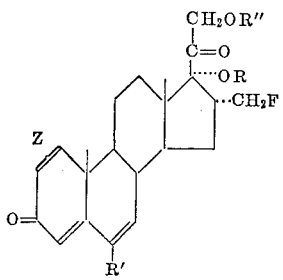

wherein R and R" are selected from the group consisting of hydrogen and a hydrocarbon carboxylic acyl group containing less than 12 carbon atoms; R' is selected from the group consisting of hydrogen, methyl, fluorine and chlorine and Z is selected from the group consisting of a double bond between C–1 and C–2 and a saturated linkage between C–1 and C–2.

References Cited by the Examiner
UNITED STATES PATENTS

| | | | |
|---|---|---|---|
| 2,902,483 | 9/1959 | Agnello et al. | 260—397.45 |
| 2,934,546 | 4/1960 | Ringold et al. | 260—397.45 |
| 3,065,239 | 11/1962 | Wendler et al. | 260—397.45 |
| 3,079,407 | 2/1963 | Sarett et al. | 260—397.4 |

OTHER REFERENCES

Fieser et al. "Steroids" (1959) Reinhold Publishing Corp. Pages 559–560 relied on.

Ringold et al. Journal Amer. Chem. Soc. (1959), pages 3485–6 relied on.

LEWIS GOTTS, *Primary Examiner.*

LESLIE H. GASTON, MORRIS LIEBMAN, *Examiners.*